(12) United States Patent
Ito et al.

(10) Patent No.: US 6,956,974 B1
(45) Date of Patent: Oct. 18, 2005

(54) IMAGE ENCODER AND IMAGE DECODER

(75) Inventors: Norio Ito, Chiba (JP); Shinya Hasegawa, Chiba (JP); Hiroshi Kusao, Chiba (JP); Hiroyuki Katata, Chiba (JP); Tomoko Aono, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/508,813

(22) PCT Filed: Sep. 3, 1998

(86) PCT No.: PCT/JP98/03963

§ 371 (c)(1),
(2), (4) Date: May 30, 2000

(87) PCT Pub. No.: WO99/16249

PCT Pub. Date: Apr. 1, 1999

(30) Foreign Application Priority Data

| Sep. 19, 1997 | (JP) | 9-254616 |
| Jan. 30, 1998 | (JP) | 10-018782 |
| Jun. 17, 1998 | (JP) | 10-169456 |

(51) Int. Cl.$^7$ .......................................... G06K 9/36

(52) U.S. Cl. .................. 382/240; 382/233; 382/248

(58) Field of Search ................ 382/240, 232, 382/233, 246, 248; 375/240.11, 240.18, 240.19

(56) References Cited

U.S. PATENT DOCUMENTS 5,563,960 A * 10/1996 Shapiro ....................... 382/239
6,229,926 B1 * 5/2001 Chui et al. ................... 382/240

FOREIGN PATENT DOCUMENTS

| JP | 4-245863 A | 9/1992 |
| JP | 4-302539 A | 10/1992 |
| JP | 5-91333 A | 4/1993 |
| JP | 6-20045 A | 1/1994 |
| JP | 6-197324 | 7/1994 |
| JP | 6-197329 A | 7/1994 |

(Continued)

OTHER PUBLICATIONS

Hauf C.R. et al., "The Flashpix™ Image File Format," The Fourth Color Imaging Conference: Color Science, Systems and Applications, 1996, pp. 234-238.

(Continued)

*Primary Examiner*—Bhavesh M. Mehta
*Assistant Examiner*—Duy M. Dang
(74) *Attorney, Agent, or Firm*—Birch Stewart Kolasch & Birch LLP

(57) ABSTRACT

An image encoder/decoder by which a partial image is encoded easily with a resolution meeting the user's demand, wherein the encoded amount of data is not increased and a necessary capacity of memory can be reduced. The image encoder has a tile decomposition portion which divides image data into tiles of N pixels×M pixels, a wavelet transform coding portion which extrapolates predetermined data at the peripheries of the tiles outputted from the tile decomposition portion and performs subdivision to perform wavelet encoding. A management information generating portion generates information for managing the encoded data in order that the encoded data outputted from the wavelet transform coding portion can be decoded for each tile and for each subband of the wavelet encoding. Also, a coded data integration portion links the encoded data encoded by wavelet encoding for each tile by using the output of the management information generating portion and adds the managing information to the encoded data.

17 Claims, 38 Drawing Sheets

ORIGINAL IMAGE 0

IMAGE 1

IMAGE 2

IMAGE 3

IMAGE 4

FOREIGN PATENT DOCUMENTS

| | | |
|---|---|---|
| JP | 8-140092 A | 5/1996 |
| JP | 8-214308 A | 8/1996 |
| JP | 9-27752 A | 1/1997 |
| JP | 9-130801 A | 5/1997 |
| JP | 9-148938 A | 6/1997 |
| JP | 9-182071 A | 7/1997 |
| JP | 9-214967 A | 8/1997 |

OTHER PUBLICATIONS

Blumberg R. et al., "Visual Realism and Interactivity for the Internet," Proceedings of IEEE COMPCON '97, San Jose, Feb. 23-26, 1997, Los Alamitos, IEEE Comp. Soc. Press, U.S., Feb. 23, 1997, pp. 269-273.

Bradley J.N. et al., "Reflected Boundary Conditions for Multirate Filter Banks," Time-Frequency and Time-Scale Analysis, 1992, Proceedings of thIEEE-SP International Symposium, Victoria, BC, Canada, Oct. 4-6, 1992, New York, NY, USA, IEE U.S., Oct. 4, 1992, pp. 307-310.

International Organization for Standardisation—IDO/IEC JTC1/SC29/WG11—Coding of Moving Pictures and Associated Audio Information—Mar. 1998—pp. 1-3—ITO, Norio et al.—"Proposal of Tiling Function for Scalable Texture Coding".

1-3-ITO, Norio et al., -"Proposal of Tiling Function for Scalable Texture Coding".

* cited by examiner

FIG. 1
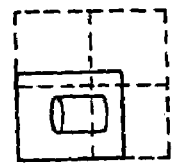
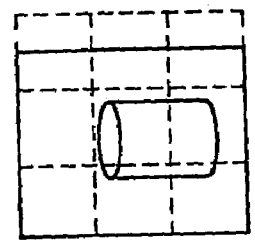
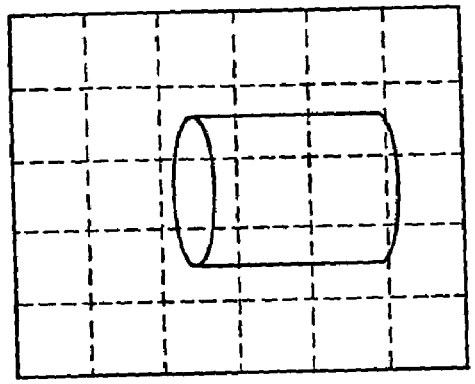
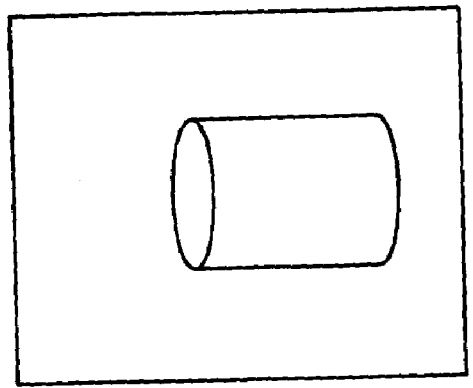

FIG.5
(A)
Original Image
(B)
Wavelet Transform Data
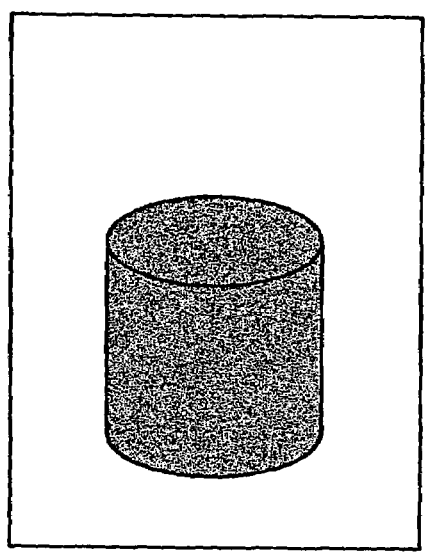
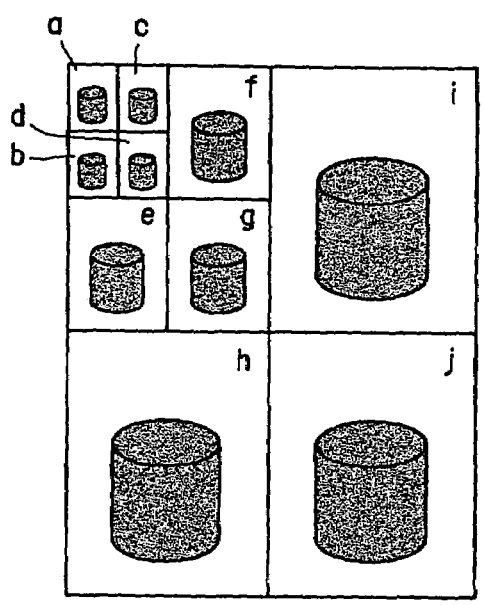

FIG.7
(A)
Original Image
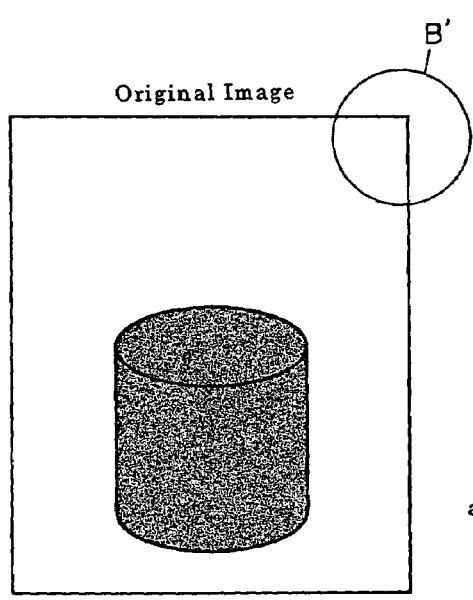
(B)
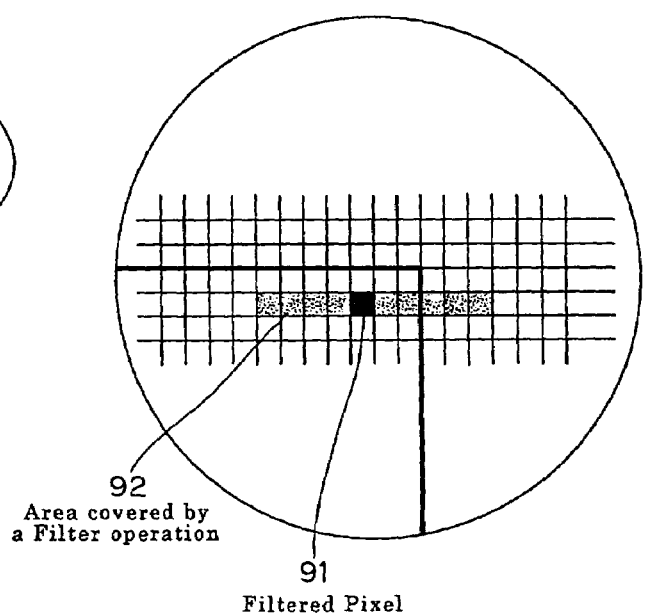
92
Area covered by
a Filter operation
91
Filtered Pixel FIG.16
(A)
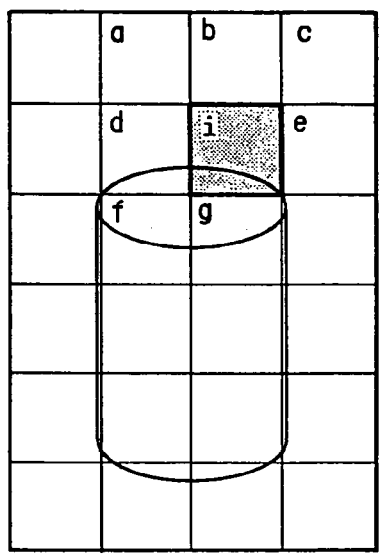
(B)
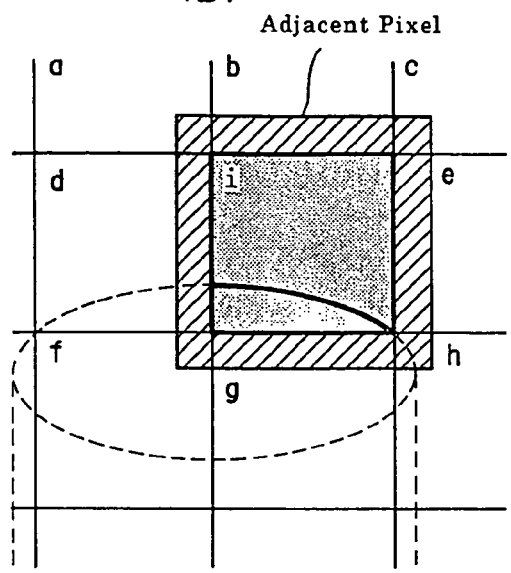
(C)
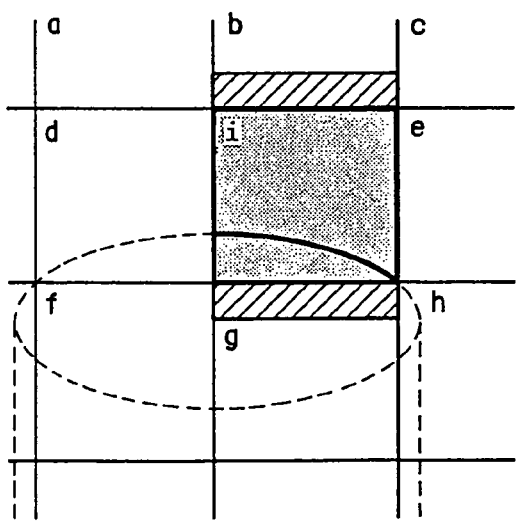
(D)
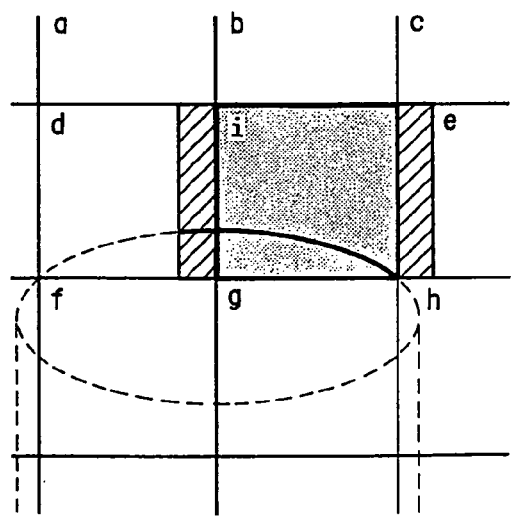

FIG.19
(A)
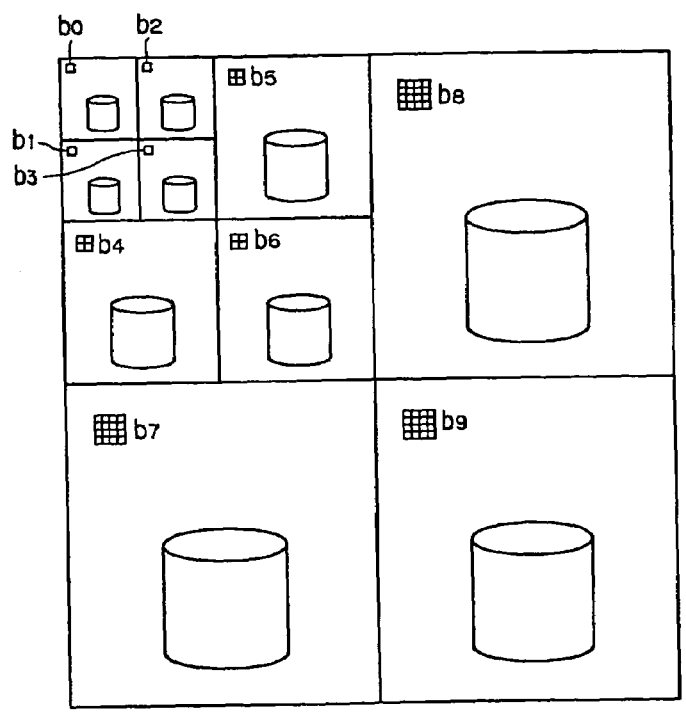
(B)
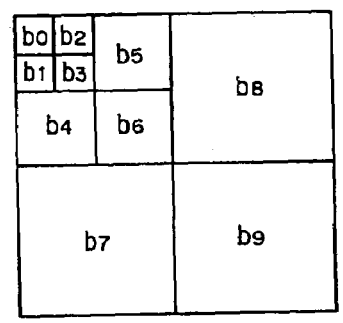

FIG.22
(A)
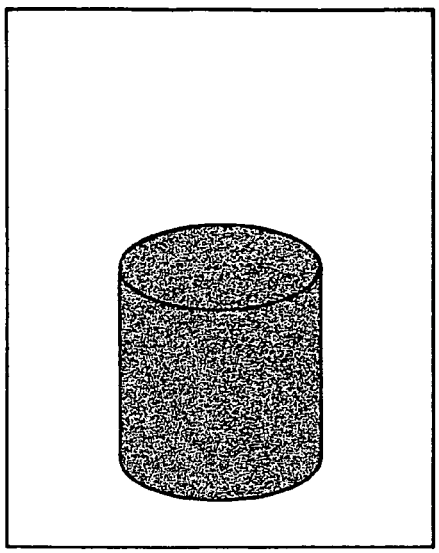
(B)
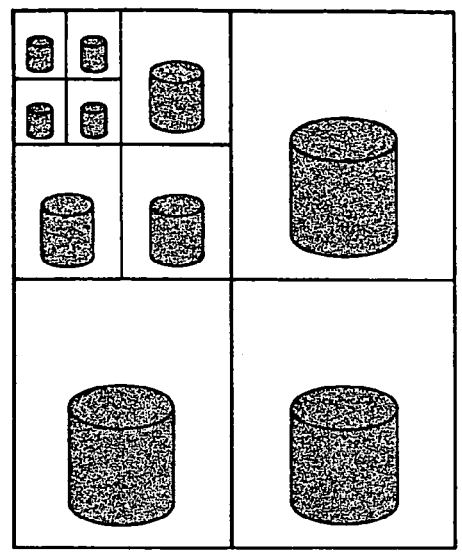
(C)
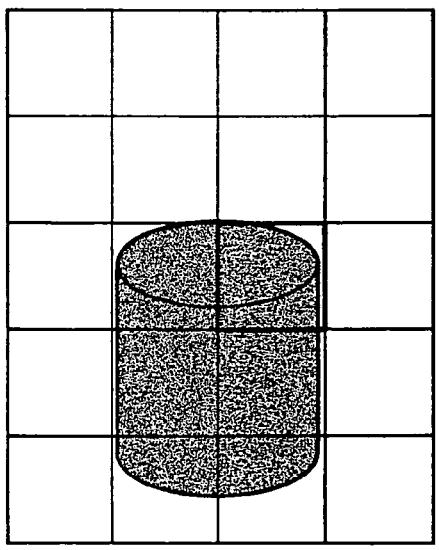
(D)
(E)
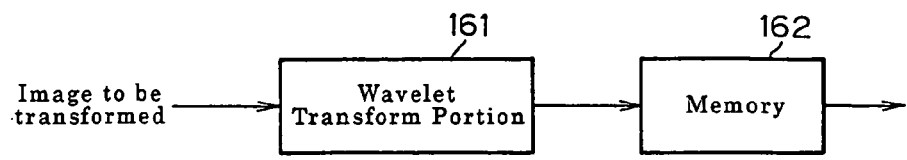

FIG.23
(A)
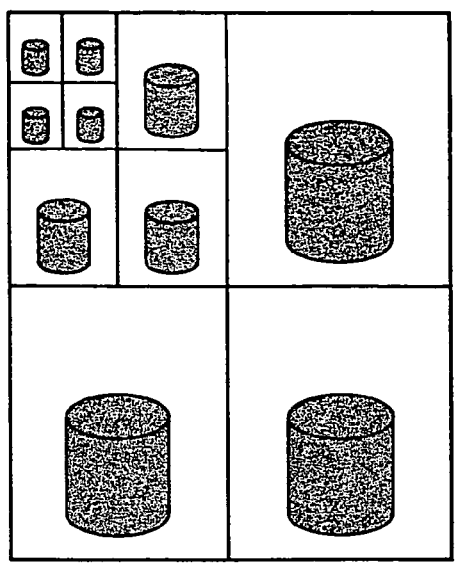
(B)
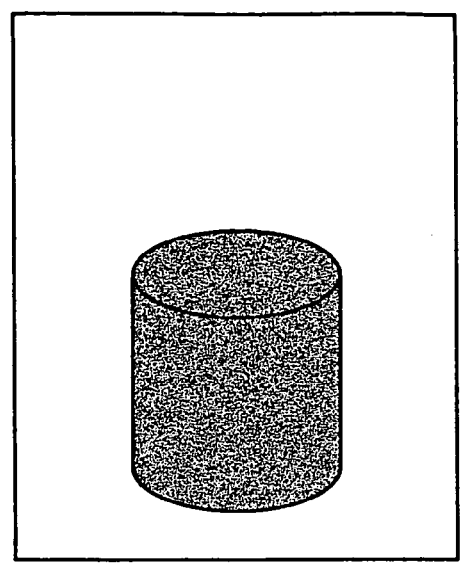
(C)
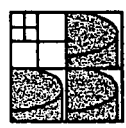
(D)
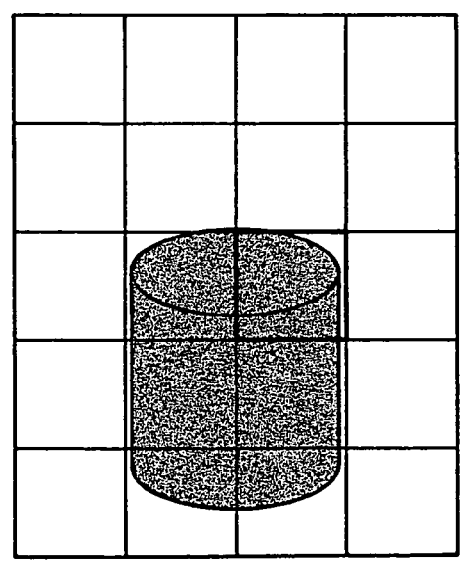
(E)
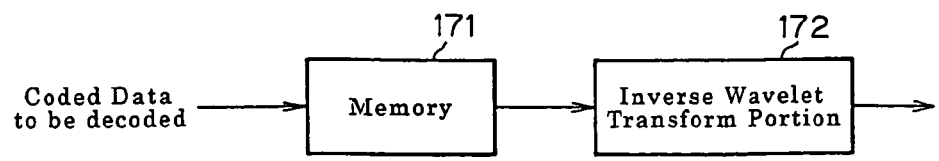

FIG.36
(A)
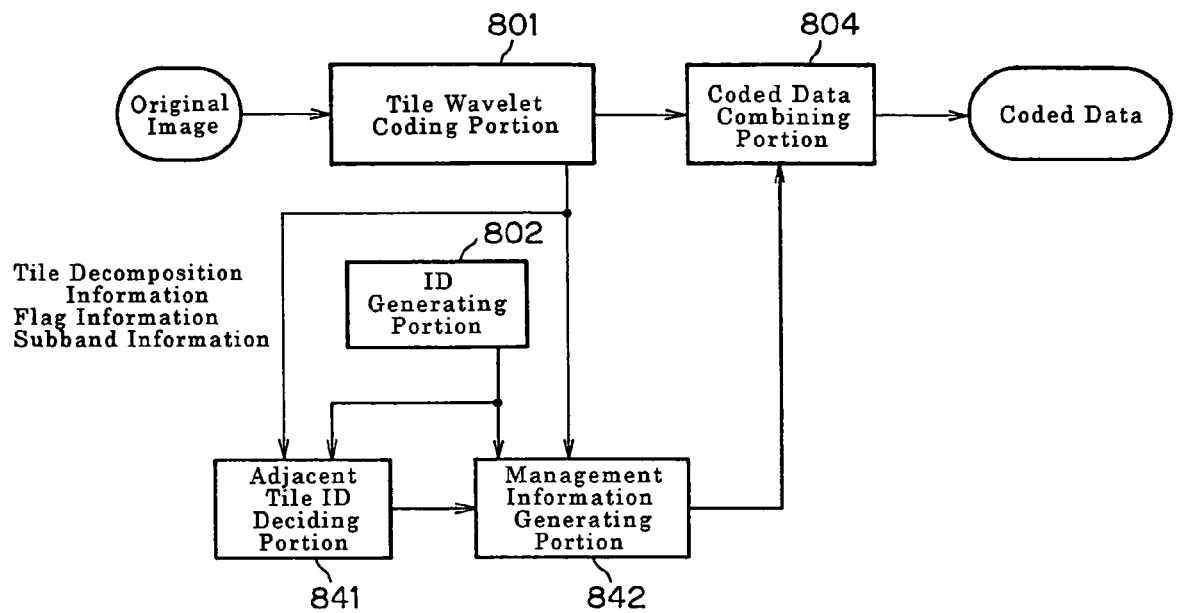
(B)
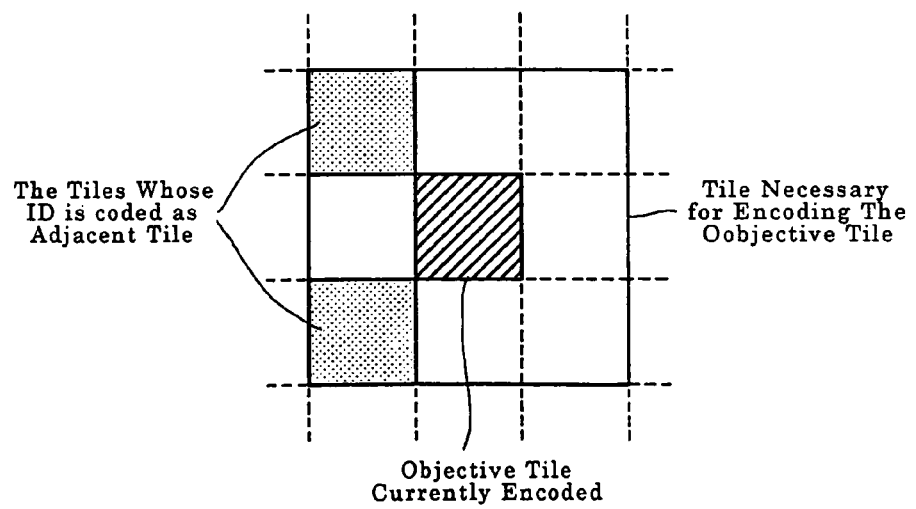

IMAGE ENCODER AND IMAGE DECODER

This application is the national phase under 35 U.S.C. § 371 of PCT International Application No. PCT/JP98/03963 which has an International filing date of Sep. 3, 1998, which designated the United States of America.

FIELD OF THE INVENTION

The present invention generally relates to the field of digital image processing and, more specifically, to an image coding device for encoding digital image data with high efficiency and an image decoding device for decoding coded data encoded by the image coding device.

BACKGROUND OF THE INVENTION

Flash Pix format specification version 1.0 has been proposed as an image format for converting natural image data into digital data suitable for computer processing.

This format specification permits a plurality of data with different resolutions to be stored together therein so that any data suited to an actual display and/or printing device can be selected and taken-out promptly in response to a user's request. Furthermore, each image is divided into tiles arranged in the format that allows the user to select only a necessary data portion of the image and process it in an enlarged or reduced size with a reduced processing load.

Referring to FIGS. 1 and 2, an image coding device for encoding an image according to the flash pix format is described as follows. In FIG. 1, images are shown in different reduced scales, each of which are divided into tiles. FIG. 2 is a block diagram of an exemplary image coding device.

The flash pix method is featured in that it generates first images 1 to 4 in sizes $\frac{1}{1}$ to $\frac{1}{8}$, as shown in FIG. 1, then divides each image into tiles and compresses data of each tile image.

First, a case of encoding an image 1 shown in FIG. 1 by the coding device of FIG. 2 is described. In FIG. 1, a dashed line shows the boundary between tiles.

A tile decomposition portion 11 divides an original image into tiles each comprising 64×64 pixels, which tiles are then compressed one by one by a JPEG compressor portion 12. In a coded-data integration portion 13, coded data of each tile is combined with tile decomposition information from the tile decomposition portion 11 to form coded data 1 to be output.

The image 2 of FIG. 1 is described. The original image 0 is reduced to ½ in length and width by a ½ contraction portion 14, and then the ½-size image is processed through a tile decomposition portion 15, a JPEG compressing portion 16 and a coded-data integration portion 17 to form coded data 2.

Size reduction of the image to generate a group of size-reduced images in FIG. 1 (Images 2 to 4) is repeatedly performed until a downsized image containable within a single tile is obtained. For example, the image 3 is still larger than a tile and is further contracted by a factor of 2 to obtain the image 4 allowable within a single tile as shown in FIG. 1. The size-reduction procedure is now finished.

Coded data for the image 3 is produced through a ½ contraction portion 18, a tile decomposition 19, a JPEG compressing portion 20 and a coded data integration portion 21. Coded data for the image 4 is produced through a ½ contraction portion 22, a tile decomposition portion 23, a JPEG compressing portion 24 and a coded data integration portion 25.

However, the above-described system involves the following problems: Storing coded data for images downsized with different resolutions in addition to coded data for the image with the scale 1:1 results in increasing a volume of coded data by a factor of 1.4. Furthermore, compression for encoding data must be done for each resolution image, resulting in considerably increasing processing load.

On the other hand, apart from the Flash Pix method, the image compression can be also accomplished by the wavelet transform technique whereby image data with different resolutions can be easily decoded from coded and compressed data of an original-size image. This technique is therefore free from the problem with increasing the amount of coded data.

Namely, the wavelet transform method can meet the demand for decoding data with different resolutions without any increase of coded data whereas the Flash Pix method has an increase by a factor of 1.4 in volume of coded data.

FIG. 3 is a basic block diagram of a wavelet transform coding portion wherein an original image is converted by a wavelet transform portion 31 into data for subband divisions, which data is quantized by a quantizing portion 104 and then entropy encoded by an entropy coding portion 33 to produce coded data. The wavelet transform portion 31, quantizing portion 32 and entropy coding portion 33 composes a so-called wavelet coding portion 34.

FIG. 4 is a detailed block diagram of the wavelet transform portion 31 of FIG. 3.

FIG. 5 depicts an example of the wavelet transformation of an image. FIGS. 4 and 5 are shown as an example of conducting two-dimensional subband decomposition three times.

An original image shown in FIG. 5A is filtered through a horizontal low-pass filter 41 and a horizontal high-pass filter 42 to create two horizontal subbands that are then decimated to ½ respectively by ½-subsampling portions 47 and 48.

Two horizontally divided subbands are divided each into two subbands through vertical low-pass filters 43, 45 and vertical high-pass filter 44, 46, which subbands are decimated each to ½ by ½ sampling portions 49 to 52. Consequently, four subbands are formed.

A high-horizontal and high-vertical frequency subband j (FIG. 4), a high-horizontal and low-vertical frequency subband i (FIG. 4) and a low-horizontal and high-vertical frequency subband h (FIG. 4) correspond to wavelet transform coefficients h, i and j (FIG. 5B) respectively.

After this, only a remaining low-horizontal and low-vertical frequency subband 53 is recursively divided into subbands.

This recursive subband decomposing process is performed by horizontal low-pass filters 54, 66, horizontal high-pass filters 55, 67, vertical low-pass filters 56, 58, 68, 70, vertical high-pass filters 57, 59, 69, 71 and ½-sampling portions 60–65, 72–77.

Sub-bands a–g (FIG. 4) correspond to sub-bands a–g (FIG. 5B) respectively.

Wavelet transform coefficients shown in FIG. 5B are quantized on a subband-by-subband basis by a quantizing portion 32 (FIG. 3) and then entropy encoded by an entropy coding portion 33 to produce coded data. The entropy-coding portion 33 may use Huffman coding or arithmetic coding.

On the other hand, wavelet-coded data is decoded by an entropy decoding portion 81 and inversely quantized by an inverse quantizing portion 82. Subbands are then combined by an inverse wavelet transform portion 83 to produce a decoded image. The entropy decoding portion 81, inverse quantizing portion 82 and inverse wavelet transform portion 83 compose a so-called wavelet decoding portion 84.

Image-encoding using the wavelet transform technique is featured by hierarchical structure according to resolution levels as shown in FIG. 5B. This method can easily decode images having different resolution levels from a part of coded data or a whole coded data.

Namely, an image of a quarter (¼) the original image size can be decoded by decoding subbands a, b and c. An image of a half (½) the original image size can be decoded by decoded subbands a, b, c, e, f and g. A complete (¹⁄₁) size image can be produced by decoding all subbands.

Referring to FIG. 7, the operation of the horizontal low-pass (H-LP), horizontal high-pass (H-HP), vertical low-pass (V-LP) and vertical high-pass (V-HP) filters shown in FIG. 4 will be described as follows. FIG. 7B is an enlarged view of an encircled part B' of FIG. 7A.

When an output of a horizontal 9 tap filter, associated with a pixel 91 positioned right top on the original image is calculated for wavelet transformation of an original image, the operation of the filter must be performed on an area 92.

However, a part of the objective area 92 is out of the boundary of the original image, where no data exists. The vertical filters may also encounter with a similar problem.

Thus, for operation on the periphery of the image, it is often needed to use external data outside the image boundary according to the number of the taps of the filter used. Iteration of the subband decomposition also results in enlarging the area into which the filter extrudes.

In general, the above problems are treated in such a manner that the image is folded at its periphery according to a certain given rule.

For the Flash Pix method using a plurality of coded data sets separately provided for respective images of different resolution levels, the image processing load such as enlargement or contraction of the image can be reduced, but the data size is increased to 1.4 times.

For wavelet-transform coding method, data with different resolution levels can be easily decoded from a single set of compressed and coded data for an original image size and, therefore, no increase in the data size takes place.

When the wavelet-transform coding system utilizes the method of decomposing an image into tiles and encoding the image data on a tile-by-tile basis, which is used in the flash-pix system (to reduce the processing load by selectively processing only necessary tiles in case of processing a particular part of the image), however, this arises the above-described problem since filters may stick from the boundary of respective tiles.

In other words, the flash pix system using the JPEG coding can easily perform coding of each tile owing to the closed property of coding in each tile, while the wavelet-transform coding system can not effectively use the above tile-by-tile coding-and-managing method because the processing causes the extrusion of filters out of respective tiles.

In addition, the conventional wavelet-transform coding system must have a memory sufficient for storing an output of the wavelet-transform portion 31 (FIG. 3), i.e., all wavelet transform coefficients as shown in FIG. 5B. Since these coefficients have the same resolution as that of the original image, the memory has to possess a large capacity. This requirement becomes severer when processing a higher resolution image.

SUMMARY OF THE INVENTION

In view of the above-described problems of the prior arts, the present invention was made to provide a compact hardware system that realizes effective encoding of images with different resolutions and effective management of coded data by tiles by using an improved wavelet-transform technique.

Accordingly, an object of the present invention is to provide an image coding and decoding system by which the image is effectively encoded and easily decoded with any resolution level desired by the user with no increase in volume of coded data.

This is a great advantage of the present invention system as compared with the conventional Flash Pix system using the JPEG coding method, which has an increased amount to 1.4 times of code data to provide a plurality of images having different resolutions.

Another object of the present invention is to provide an image-coding and decoding system in which an image is decomposed into tiles and encoded on a tile-by-tile basis and the coded tiles can selectively decoded on the same principle by using the wavelet-transform coding/decoding technique. This could not be accomplished by the conventional wavelet-transform coding/decoding system because it is difficult in principle to apply the wavelet transform to closed tiles of the image.

Another object of the present invention is to provide an image coding and decoding system that encodes an image on a tile-by-tile basis and allows the coded image to be partially decoded by selectively decoding only necessary tiles (without the necessity of decoding a whole image), thus improving the random access function of the system.

BRIEF DESCRIPTION OF THE DRAWINGS

FIG. 1 is a view for explaining how to reduce an image in size and decompose each image into tiles by a prior art.

FIG. 5 is a view for explaining a correlation between an original image and wavelet-transformed data.

FIG. 7 is a view for explaining vertical and horizontal filters for wavelet-transform of an original image.

FIG. 16 is view for explaining the operation of an image coding device according to the embodiment 5 of the present invention.

FIG. 19 is view for explaining the operation of an image coding device according to the embodiment 7 of the present invention.

FIG. 22 is a block diagram of an image coding device according to an embodiment 10 of the present invention, with a view for explaining the operation of the same device.

FIG. 23 is a block diagram of an image decoding device according to an embodiment 11 of the present invention, with a view for explaining the operation of the same device.

FIG. 36 is a block diagram of an exemplary image coding device according to an embodiment 16 of the present invention, with a view for explaining the operation of the same device.

DETAILED DESCRIPTION OF THE PREFERRED EMBODIMENT

Figure 2:
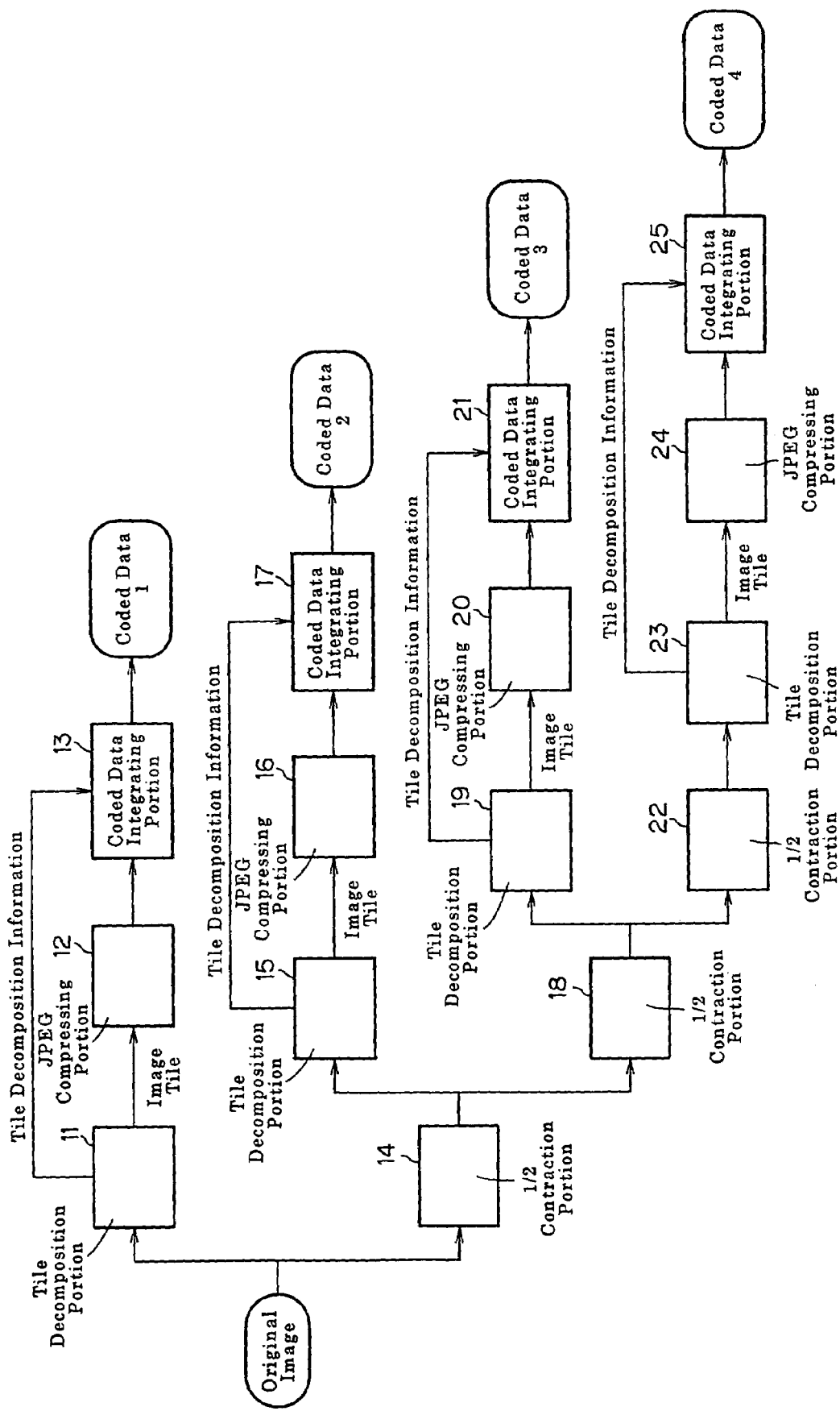
FIG. 2 shows an exemplary coding device for encoding an image 1 shown in FIG. 1.
Figure 3:
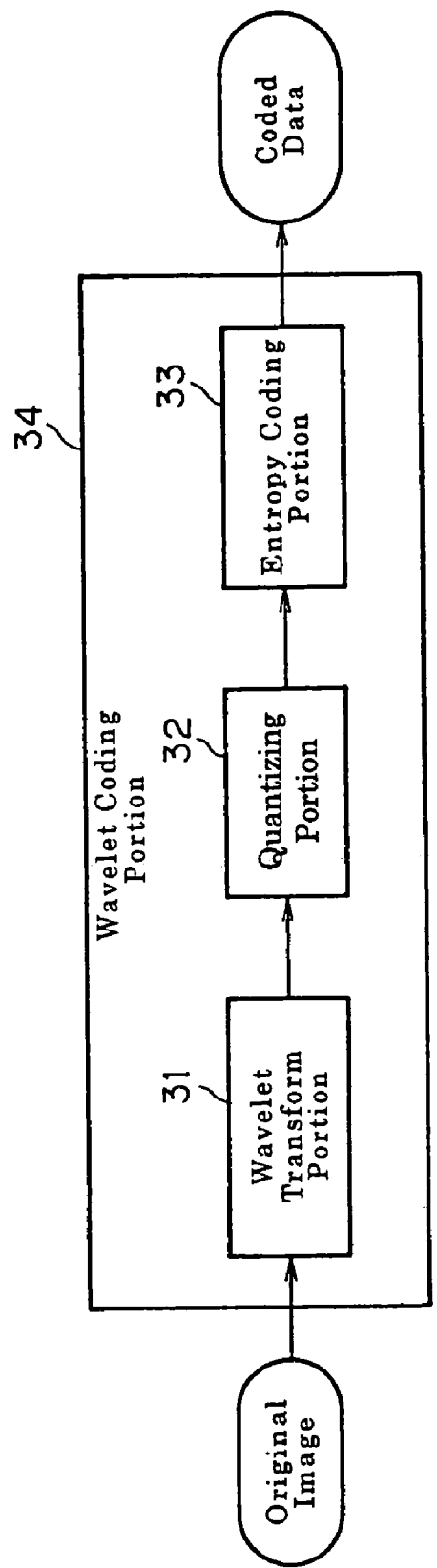
FIG. 3 is a basic block diagram of a wavelet-coding portion.
Figure 4:
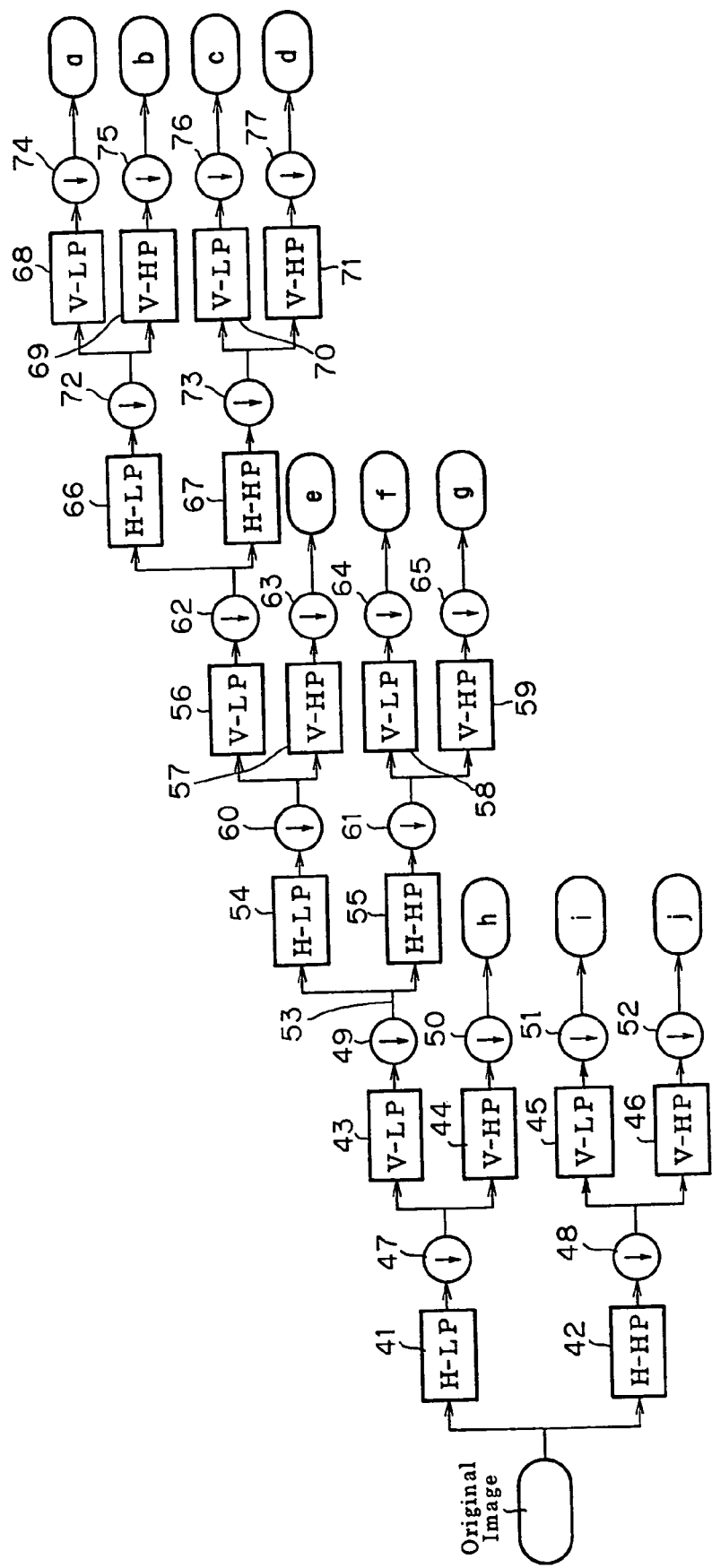
FIG. 4 is a detailed block diagram of a wavelet transform portion.
Figure 6:
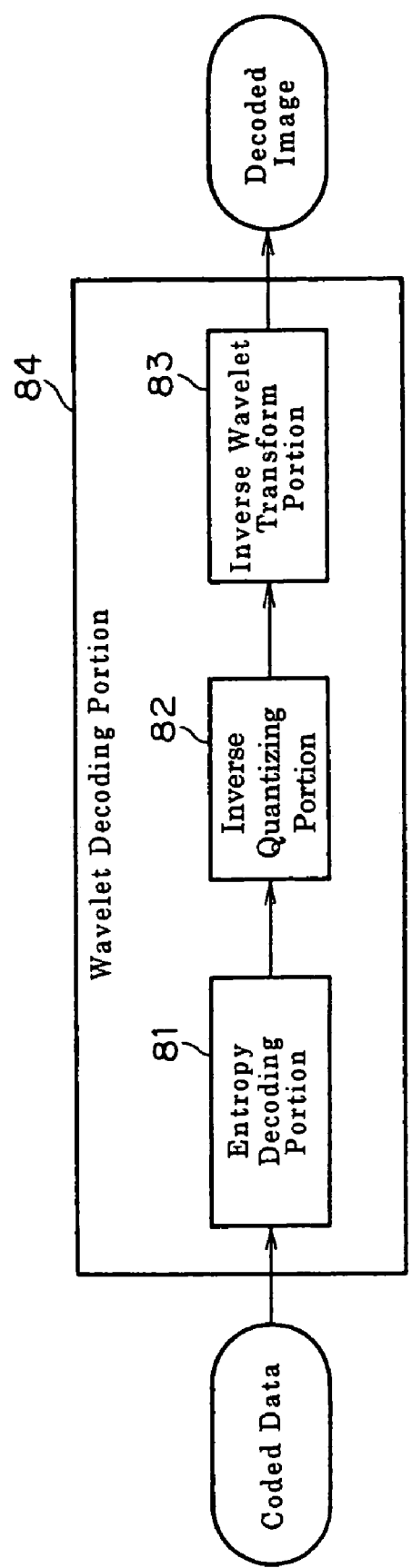
FIG. 6 is a basic block diagram of a wavelet decoding portion.
Figure 8:
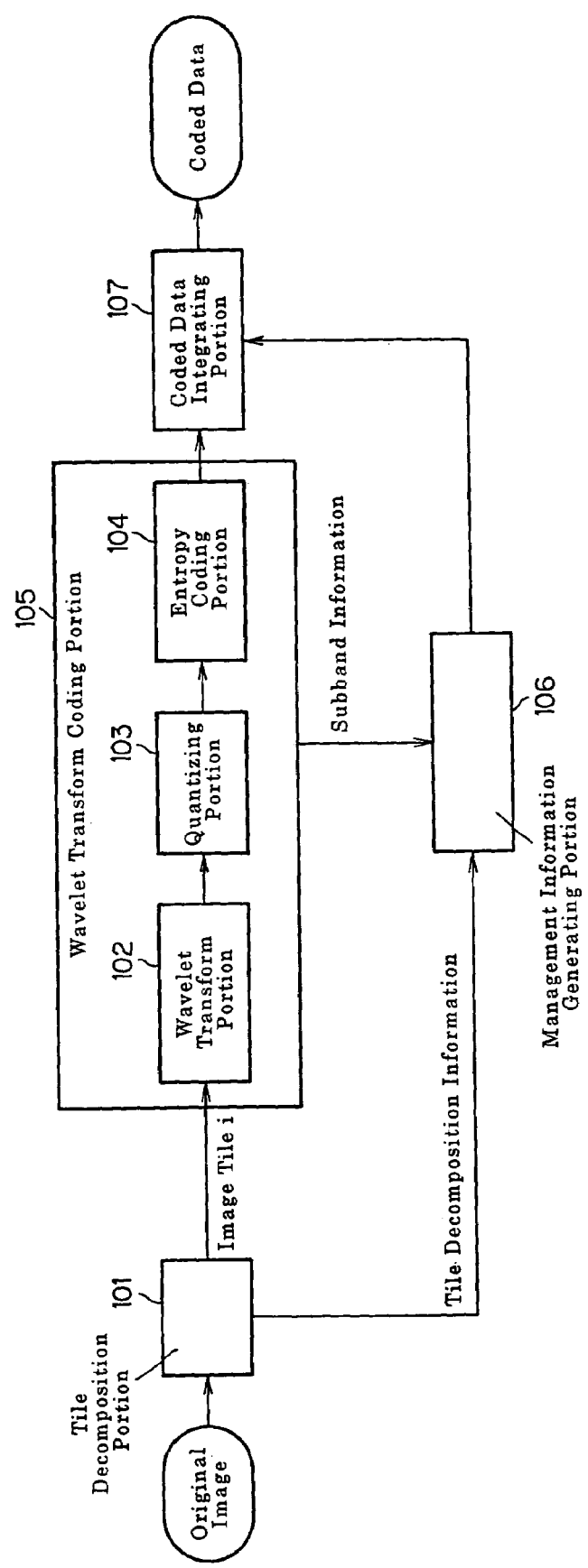
FIG. 8 is a block diagram of an image coding device according to an embodiment 1 of the present invention.

FIG. 8 is a block diagram showing the construction of an image coding device that is an embodiment 1 of the present invention.

Figure 9:
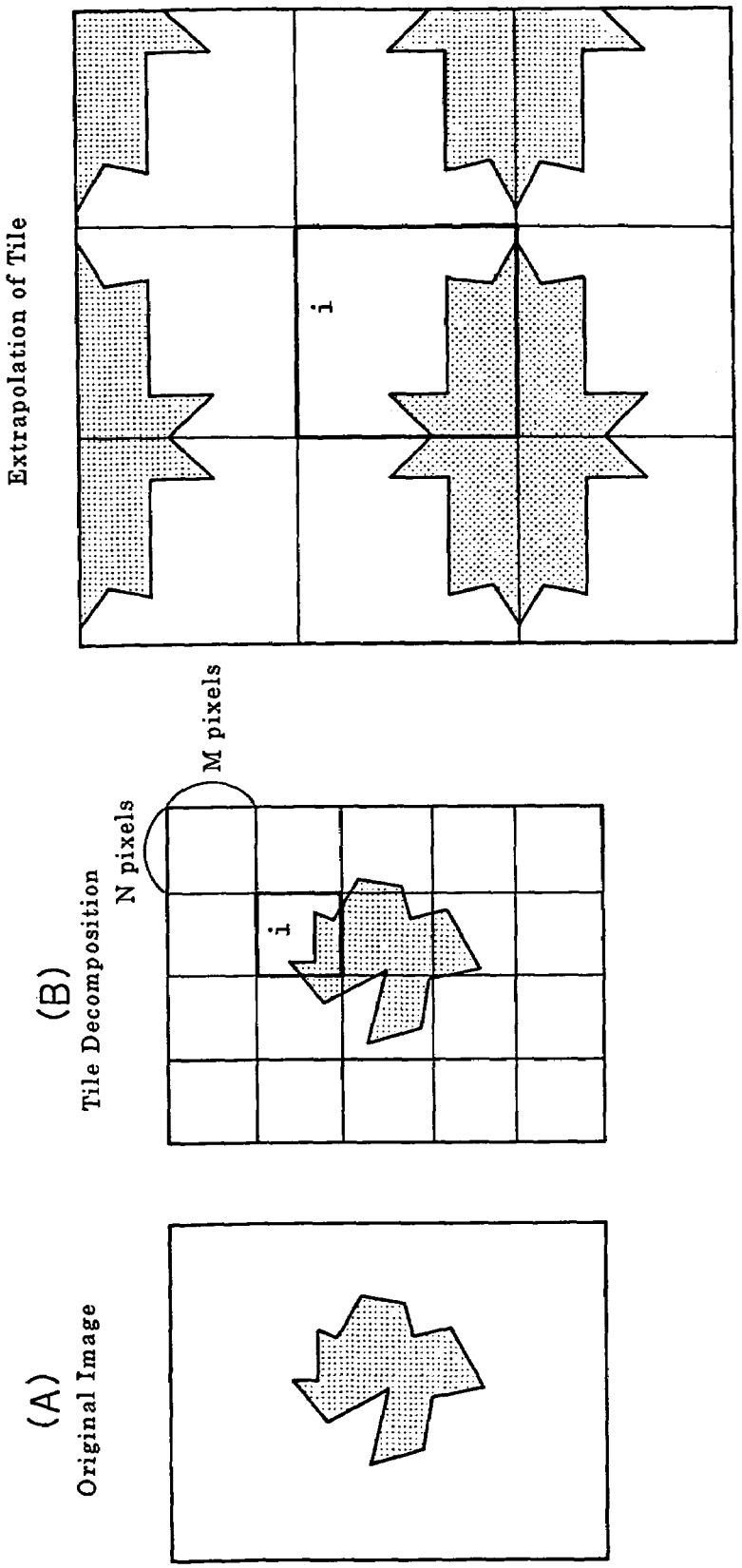
FIG. 9 is view for explaining the operation of an image coding device according to the embodiment 1 of the present invention.

Image data of an original image as shown in FIG. 9A is decomposed by a tile decomposition portion 101 into tiles each of predetermined N pixels by M pixels. The decomposed image is shown in FIG. 9B. The tile decomposition portion 101 outputs N pixels by M pixels image in a tile as corresponding data to each tile.

Further processing will be described by way of example on a tile "i" in FIG. 9B. Image data of the tile "i" is divided by a wavelet transform portion 102 into subbands.

Data at the periphery of a tile is extrapolated when dividing the tile portion near its boundary into subbands. For example, as shown in FIG. 7B, an area 92 covered by a wavelet transform filter exists out of a tile. In this case, it is needed to add data at the periphery of the tile. The wavelet transform portion 102 therefore extrapolates data at the periphery of each tile and divides the tile into subbands.

The data extrapolation is achieved for example by generating a mirror image by outwardly folding an internal image of the tile as shown in FIG. 9C. A quantizing portion 103 quantizes wavelet transform coefficients and an entropy coding portion 104 performs entropy coding of the coefficients to obtain coded data of the tile "i".

The entropy coding can be achieved by using a known Huffman coding method or arithmetic coding method. The wavelet transform portion 102, quantizing portion 103 and entropy coding portion 104 composes a so-called wavelet transform coding portion 105.

On the other hand, a management information generating portion 106 generates information for identifying and managing tiles and subbands by using information on spatial locations of each tile from the tile decomposition portion 101 and information on each subband from the wavelet transform coding portion 105. The management information is utilized by a coded data integration portion 107.

Using the management information from a management information generating portion 106, the coded data integration portion 107 arranges and integrates information on the coded data from the entropy coding portion and adds the management information to a bit stream to generate coded data.

Management of the coded data according the tiles and subbands is needed for achieving decoding of a coded image at different resolution levels as shown in FIG. 1 or a particular tile or tiles of the coded image.

Figure 10:
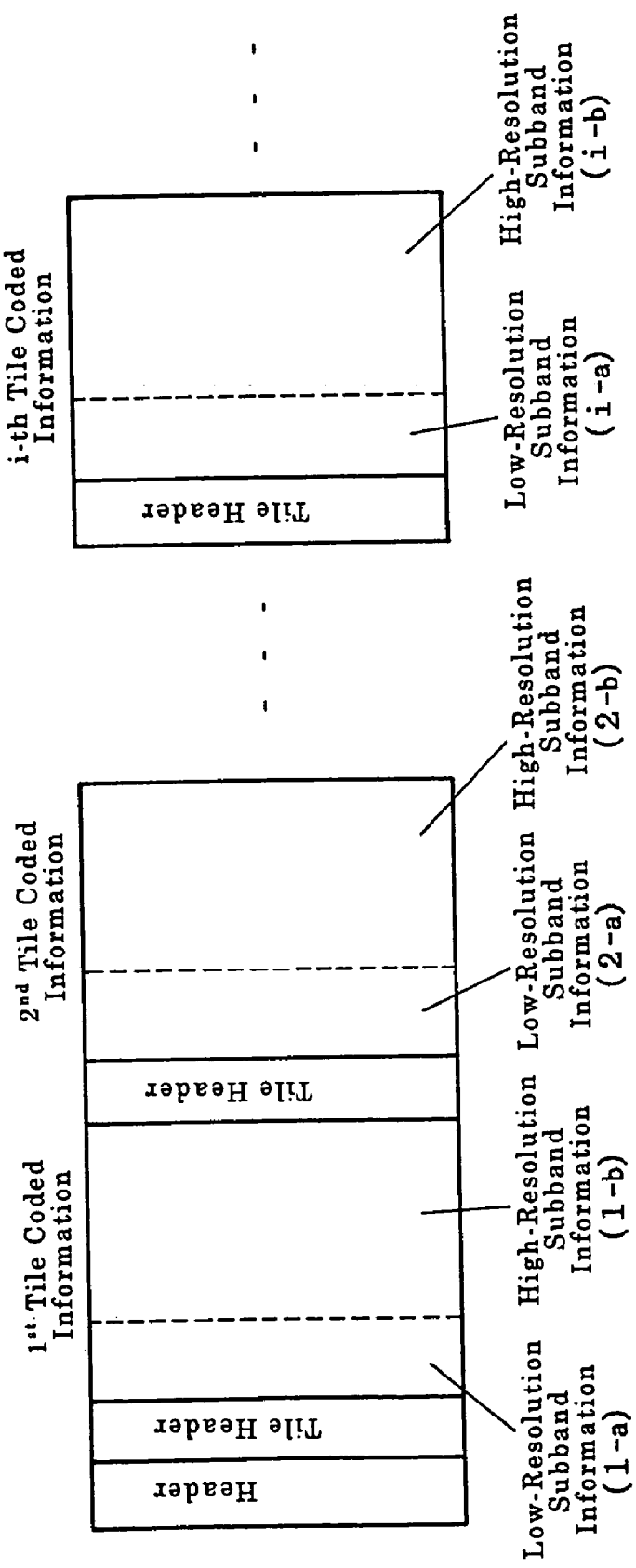
FIG. 10 shows an exemplified bit stream in an image coding device according to the embodiment 1 of the present invention.

FIG. 10 shows an example of a bit stream of coded data produced in the above-described manner. The bit stream is composed of a header for managing information on a whole bit stream and information on each tile. Information for each tile consists of a tile header for managing the tile information and coded information representing a tile image encoded by the wavelet transform coding portion 105.

The tile header includes information on bit positions corresponding to respective subbands. A bit sequence corresponding to necessary one of the subbands can be found by accessing this information.

Figure 11:
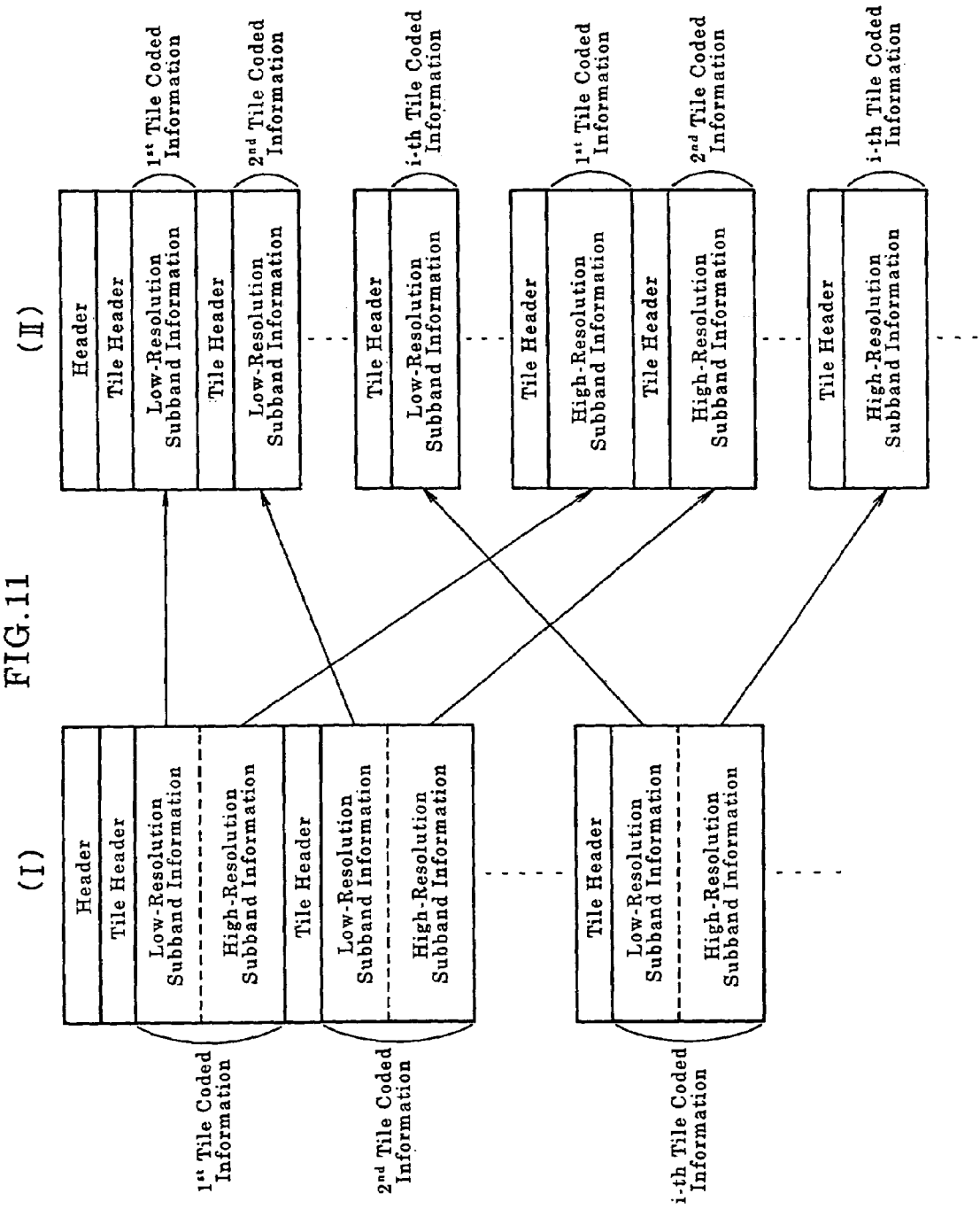
FIG. 11 shows another exemplified bit stream in an image coding device according to the embodiment 1 of the present invention.

The structure of bit streams used in the system of the present invention is not limited to that shown in FIG. 10. For example, a sequence (I) A of FIG. 11 is similar to the sequence of FIG. 10, while a sequence (II) of FIG. 11 has the form in which each subband for a tile is separated and rearranged with a tile header added thereto. The latter sequence (II) allows the system to quickly reproduce a desirable contracted image by accessing only necessary tile or tiles in the sequence.

An image coding device according another embodiment 2 of the present invention will be described as follows. The image coding device of the embodiment 2 is similar in construction to the embodiment 1 shown in FIG. 8 but differs from the embodiment 1 described above with the FIG. 8 by the operation of the tile decomposition portion 101, which will be described below with reference to FIG. 12.

While the tile decomposition portion 101 of the embodiment 1 decomposes an image into tiles each of N pixels by M pixels and outputs only image data within each tile to the wavelet transform portion 102, the tile decomposition portion 101 of embodiment 2 outputs image data obtained by multiplying the original image by a suitable window function.

For example, in case of extracting a tile "ij", the output of the tile decomposition portion 101 is a result of multiplying the original image data by a window function $FX_i$ in the horizontal direction and by a window function $Fy_j$ in the vertical direction. i denotes a horizontal tile number and j denotes a vertical tile number.

This means that the output of the tile decomposition portion 101 represents a weighted result of multiplying a shaded image portion (FIG. 12) by a weight corresponding to window functions. Window functions are such that a total of functions over a whole area is equal to 1. Window functions satisfying the following conditions are used.

$$\Sigma FX_i(x)=1 (0 \leq x \leq w)$$

$$\Sigma FY_j(y)=1 (0 \leq y \leq h)$$

where, w is the width of the original image, h is the height of the original image, x and y are the axes of abscissa and ordinate, respectively, with the origin at the top right corner of the original image.

Figure 12:
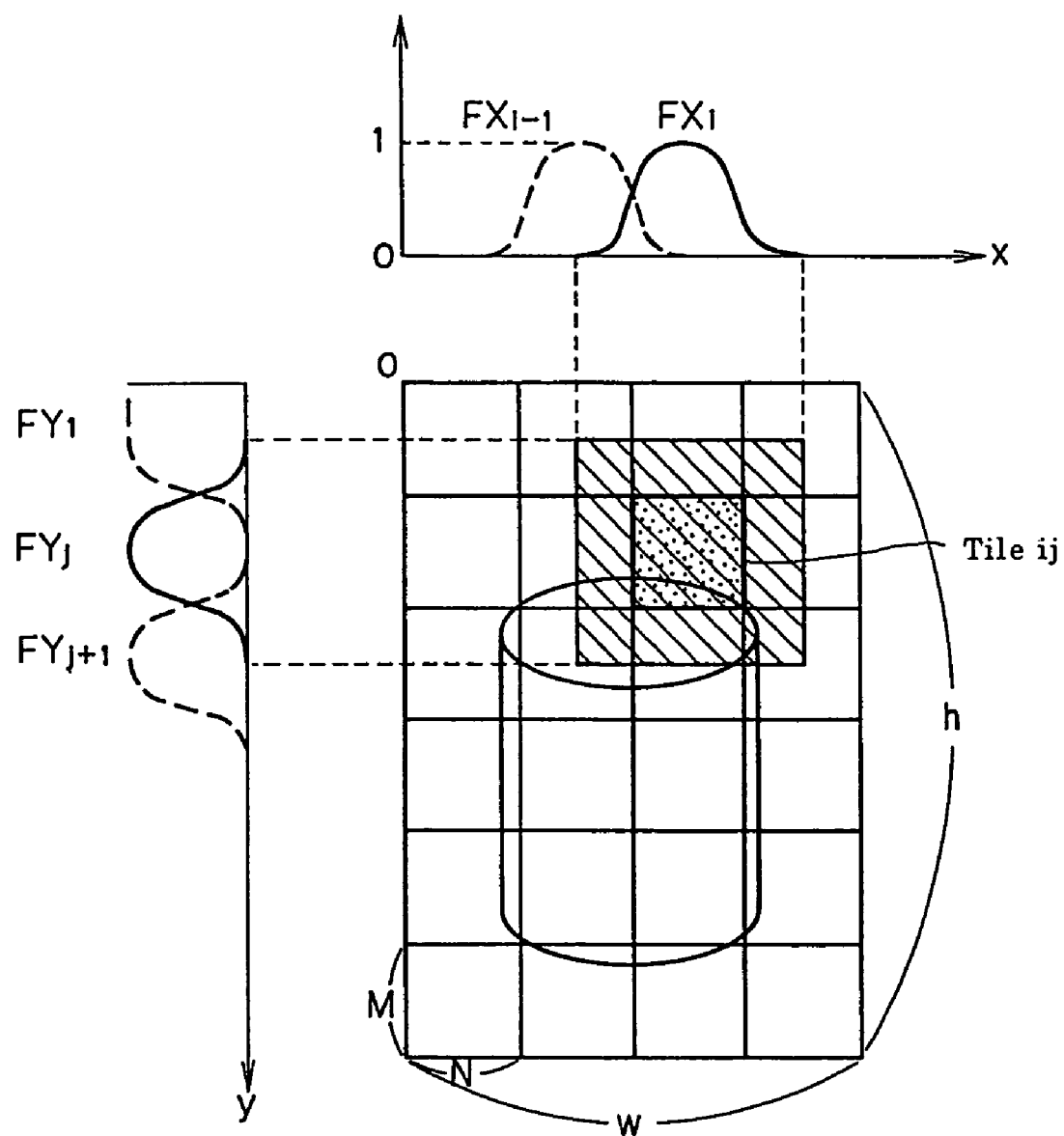
FIG. 12 is view for explaining the operation of an image coding device that is an embodiment 2 of the present invention.

A total of the functions $FX_i(x)$ is taken for i and $FY_j(y)$ is taken for j. In FIG. 12, $FX_{i-1}$, $FX_{i-1}$, $FXY_i$, $FY_j$, $FY_{j+1}$ are exemplary functions satisfying the above conditions.

In consequence of the extraction of data by applying window functions, the output of the tile decomposition portion 101 includes pixels of a tile ij plus peripheral pixels weighted with the window function values.

Figure 13:
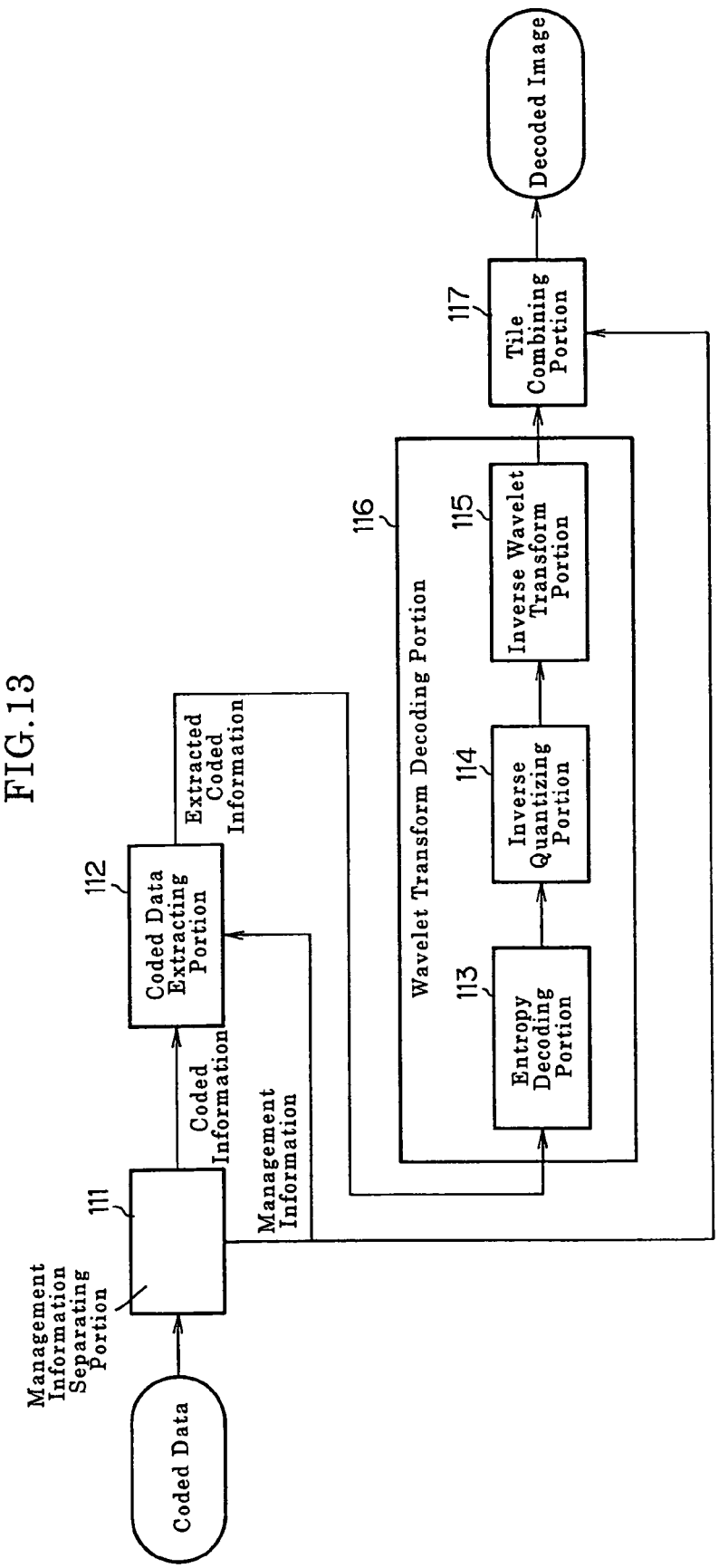
FIG. 13 is a block diagram of an image decoding device according to an embodiment 3 of the present invention.

An image decoding device for decoding coded data from the image coding device of the embodiment 1 will be now described as an embodiment 3 of the present invention. FIG. 13 is a block diagram of the image decoding device according to the embodiment 3.

The image decoding device receives coded data from the image coding device described as the embodiment 1 of the present invention. A management data separating portion 111 takes out information for managing tiles and subbands from the received coded data.

A coded data extracting portion 112 selectively extracts coded data of necessary tile and subbands according to the user's request. In the exemplary bit stream shown in FIG. 10, the management information is found in the header and the tile header.

The extracted coded information is entropy-decoded by an entropy decoding portion 113 and inversely quantized by an inverse quantizing portion 114 to produce wavelet-transform coefficients corresponding to the tile to be decoded.

The wavelet-transform coefficients are inversely transformed by an inverse wavelet transform portion 115 to produce a decoded image of the objective tile. The entropy-decoding portion 113, inverse quantizing portion 114 and inverse wavelet-transform portion 115 compose a so-called wavelet-transform decoding portion 116.

A tile combining portion 117 combines together decoded tiles according to the tile managing information to generate a decoded image of the desired area or at a desired resolution.

The decoding process with the bit stream shown in FIG. 10 is as follows. To decode a low-resolution entire image (all tiles), coded data (1–a, 2–a, ..., i–a, ...), which correspond to low-resolution subbands, are decoded in order in respective tile by the wavelet-transform decoding portion 116 according to the tile with referring to subband information included in each tile header.

The low-resolution decoded tiles are then combined by the tile-combining portion 117, thereby a whole low-resolution image is reproduced.

From the low-resolution decoded image, a particular tile "i" can also be reproduced in an enlarged scale with the highest resolution by decoding all the coded information of the i-th tile which correspond to the tile image "i".

Namely, coded information i–b extracted and decoded together with already extracted coded information i–a to obtain the desired decoded image. It is, of-course, possible to reproduce a high-resolution decoded image of all areas by decoding all coded information (all tiles including all subbands).

Thus, the image decoding device can easily decode any resolution image and/or any tile (partial) image can be easily decoded according to the user's request.

An image decoding device according to another embodiment 4 of the present invention is as follows:

Coded data is input from the image coding device according to the embodiment 2 of the present invention. This image decoding device is similar in construction to the embodiment 3 shown in FIG. 13 and differs from the latter by the operation of the tile-combining portion 117, which will be described below with reference to FIG. 14.

In the image coding device according to the embodiment 2, pixels of each tile have been encoded together with pixels at its periphery. Therefore, data of a tile decoded in a wavelet-transform decoding portion 116 of this image decoding device is larger than an actual tile.

Figure 14:
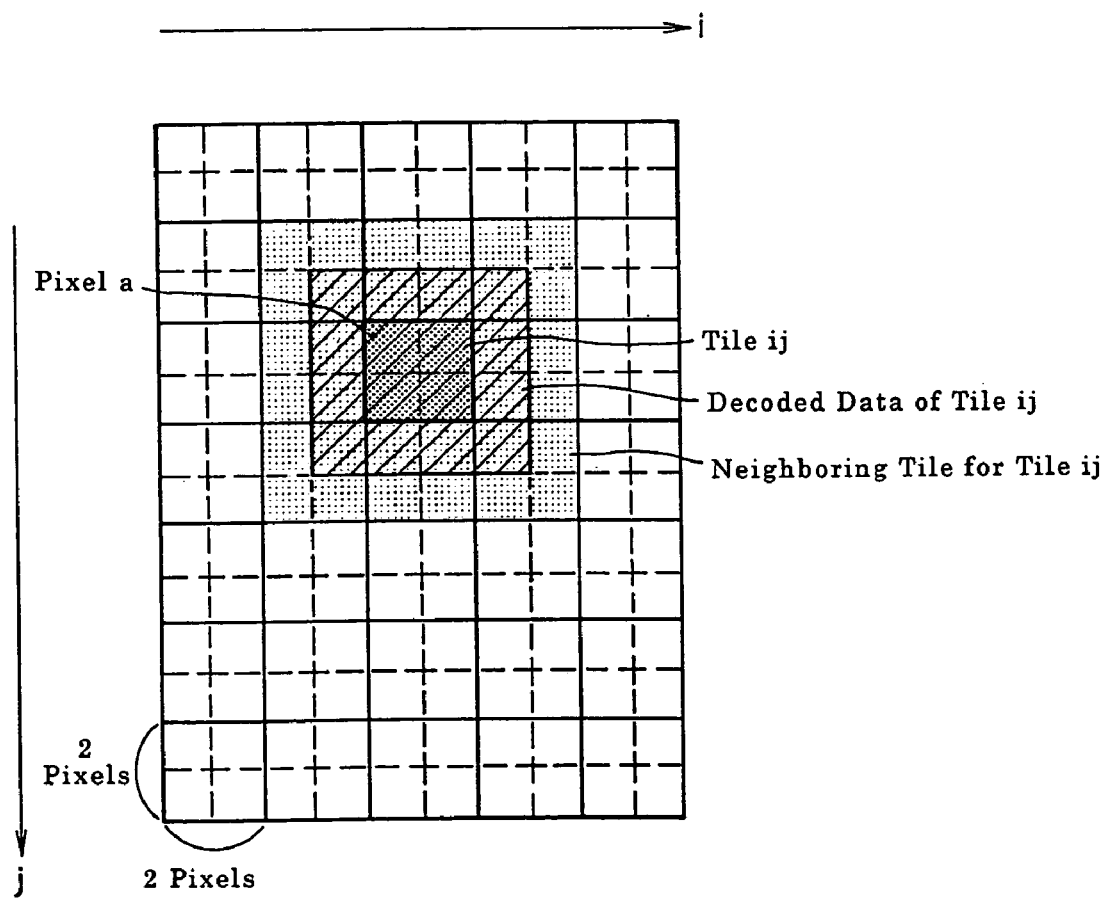
FIG. 14 is view for explaining the operation of an image decoding device according to an embodiment 4 of the present invention.

In FIG. 14, a tile is composed of 2×2 pixels and the data size of a decoded tile is of 4×4 pixels. In this case, decoded data of a tile ij has an area shaded in FIG. 14, which overlaps neighbors each by one pixel width.

The tile-combining portion 117 determines a pixel value for each overlap by adding together decoded data thereat when linking the decoded tiles. For example, the value of a pixel "a" in FIG. 14 is calculated as follows:

$$a(i-1,j-1)+a(i,j-1)+a(i-1,j)+a(i,j)$$

where a(i,j) represents decoded data of the tile ij at the position of its pixel "a".

Figure 15:
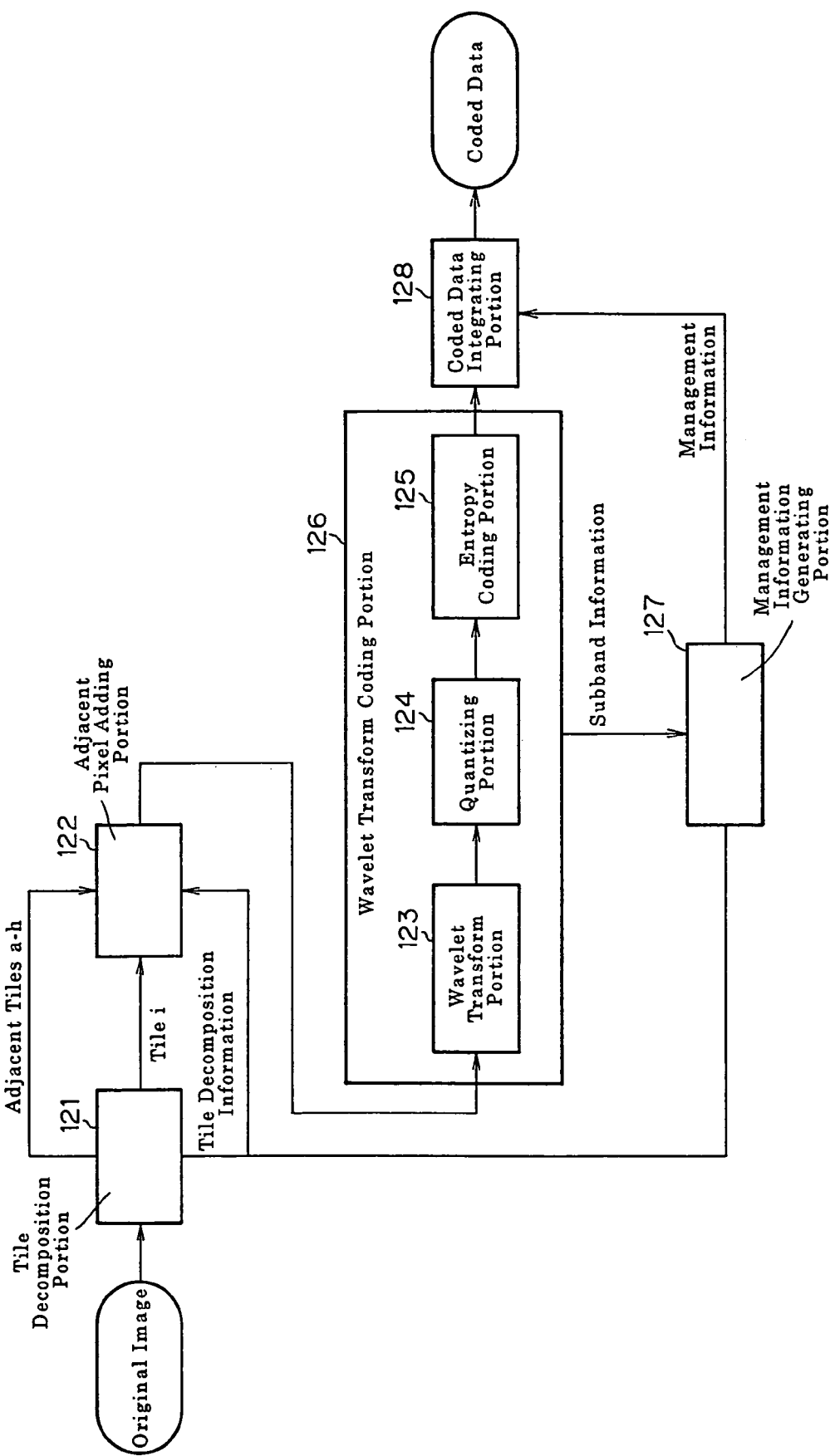
FIG. 15 is a block diagram of an image coding device according to an embodiment 5 of the present invention.

An image coding device according to another embodiment 5 of the present invention will be described with reference to FIG. 15 showing its construction.

This image coding device differs from the image coding device (embodiment 1) of FIG. 8 by the fact that it does not unconditionally conduct extrapolation of data at the periphery of an objective tile and utilizes another tile adjacent to the tile if such exists.

Like the embodiment 1, this image coding device decomposes an original image into tiles as shown in FIG. 16A at its tile decomposition portion 121 shown in FIG. 15. The image coding device further processes a tile "i" of the image as follows: In a wavelet-transform coding portion 123, image data of the tile "i" is wavelet-transformed through a wavelet-transform filter. In this case, if the filter extrudes from the tile "i" into neighboring tiles and covers part of pixels contained in the neighbors, image data of those pixels in the neighbors are also wavelet-transformed together with the image data of the objective tile "i" by the filter.

Referring to FIG. 16, the objective tile "i" of FIG. 16A is extended by adding necessary shaded parts of neighboring tiles a–h as shown in FIG. 16B and then wavelet-transformed.

An adjacent pixel adding portion 122 realizes the above process by recognizing neighboring tiles around the objective tile according to the tile decomposition information and by adding necessary pixels if the neighbors exist.

In the shown case, the adjacent pixel adding portion 122 adds to the objective tile "i" all neighboring pixels existing around there and outputs an increased volume of image data to a wavelet transform portion 123. The wavelet transform portion 123 must therefore transform a larger image area data as compared with the wavelet transform portion 102 of the embodiment 1 that transforms a single tile image.

With an increased image data to be transformed, the image coding device requires an enlarged working area for processing the data, resulting in increasing the cost of the device and decreasing the operating speed. Therefore, it is desirable to use another mode for reducing the size of data to be transformed by the wavelet-transform portion.

This mode is such that the additional adjacent area to be added by the peripheral pixel adding portion 122 to an objective tile area is limited to one direction "x" or "y" as shown in FIG. 16C or 16D to reduce the image data to be input to the wavelet transform portion 123.

For example, in case of FIG. 16C, an objective tile is provided with necessary pixels from upper and lower neighboring tiles if they exist. The right and left sides of the objective tile are treated by generating mirror images by folding the inside image of the tile. The case of FIG. 16D differs the above case of FIG. 16C by adding pixels from the right and left neighbors and generating mirror images for its top and bottom sides.

There are two alternative methods for performing the wavelet transform of the image data of the objective tile. One method is to recursively discompose any of the tile of FIGS. 16B, 16C and 16D. The other method is to selectively apply any of the above three pixel-addition modes (FIGS. 16B, 16C and 16D) for each subband.

The wavelet transform portion 123 generates wavelet transform coefficients of pixels included within the objective tile "i" using only for calculation purpose of wavelet transform coefficients of the pixels added thereto by the peripheral pixel adding portion 122.

A quantizing portion 124 quantizes the wavelet transform coefficients and an entropy coding portion 125 performs entropy encoding of the quantized coefficients to obtain coded information of the objective tile "i". The wavelet transform portion 123, quantizing portion 124 and entropy-coding portion 125 composes a so-called wavelet transform coding portion 126.

On the other hands, a management information generating portion 127 receives spatial-tile-position information from the tile decomposition portion 121 and subband information from the wavelet transform coding portion 126 and generates management information for managing and identifying tiles and subbands. The management information is used by a coded-data integrating portion 128.

The coded data integrating portion 128 rearranges and integrates coded information outputted from the entropy coding portion 125 according to the management information outputted from the management portion 127 and then adds the management information to a bit stream to generate a final coded data as shown for example in FIG. 10.

An image coding device according to still another embodiment 6 of the present invention will be described below:

This image coding device is similar in construction to the device of the embodiment 5 described above with reference to FIG. 15 but differs from the latter only by the operation of its peripheral-pixel adding portion 122. The operation of the peripheral-pixel adding potion 122 is described below with reference to FIG. 17.

Figure 17:
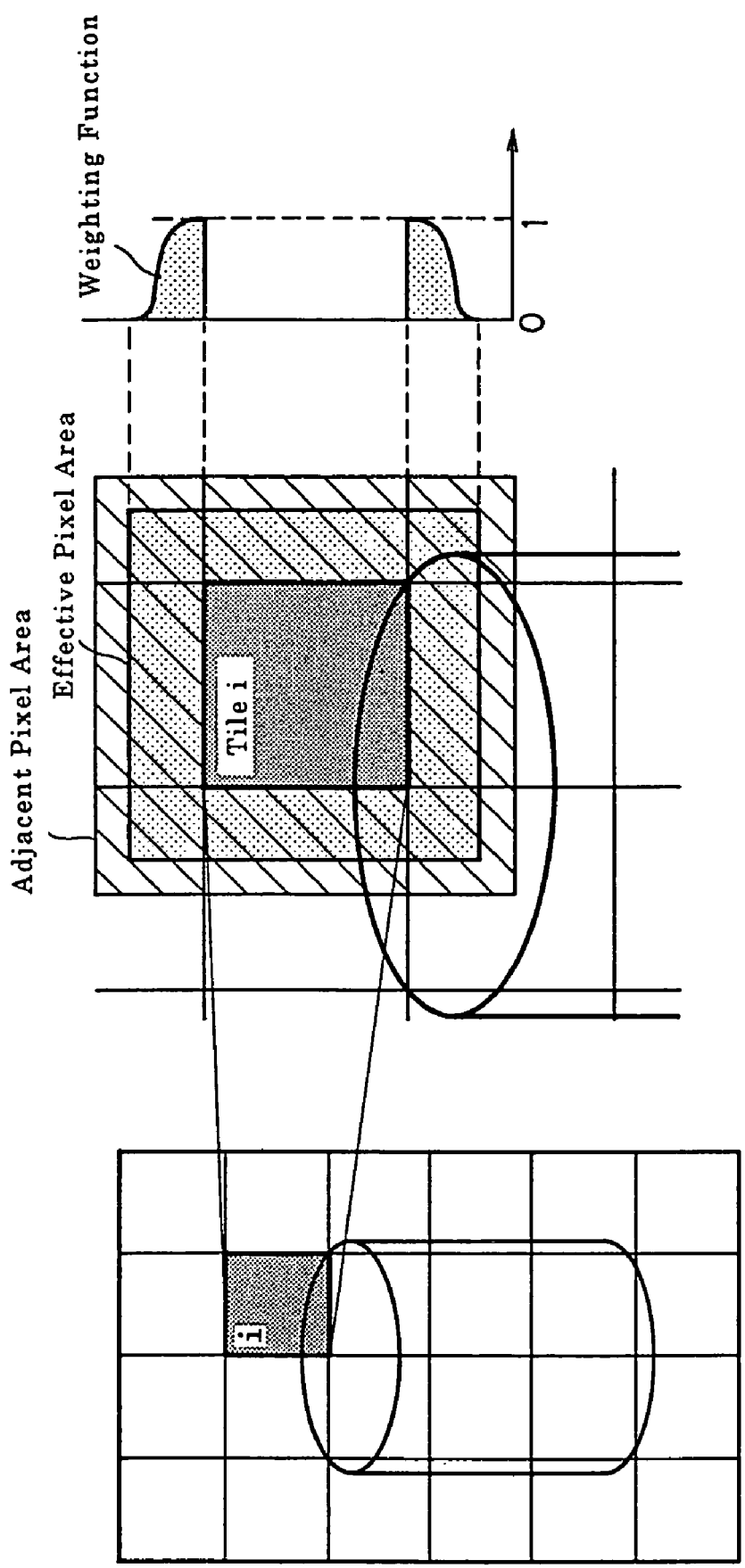
FIG. 17 is view for explaining the operation of an image coding device according to an embodiment 6 of the present invention.

An objective tile "i" in FIG. 17 is now processed by way of example as follows:

In the embodiment 5, the peripheral-pixel-adding portion 122 added to a tile "i" all pixels necessary for calculating wavelet-transform coefficients for pixels in the objective tile, that is, pixels in areas covered by a filter extending from the objective tile. The adjacent pixel areas are shown as shaded in FIG. 17.

Since distant pixels have a small effect on wavelet transform coefficients in a tile "i", the embodiment 6 adds a result of multiplying peripheral pixels by a suitable weighing function to the tile "i" to reduce the number of pixels to be attached, i.e., lighten the computation work load.

The weighting function is 1 for each pixel near the tile "i" and has a distance-depending value approaching to zero as a distance from the tile "i" increases. In FIG. 17, there is an example of a weighting function. Pixels multiplied by the weighting function and actually added to the objective tile compose an effective pixel area mesh-dotted in FIG. 17. A peripheral pixel area shown as shaded only in FIG. 17 is necessary for wavelet transform calculation but is not added because its weighted value is zero.

Alternatively, a stepwise weighting function may be applied, which is given 1 for each pixel within a specified distance from the tile "i" and 0 for all pixels existing over the specified distance.

Figure 18:
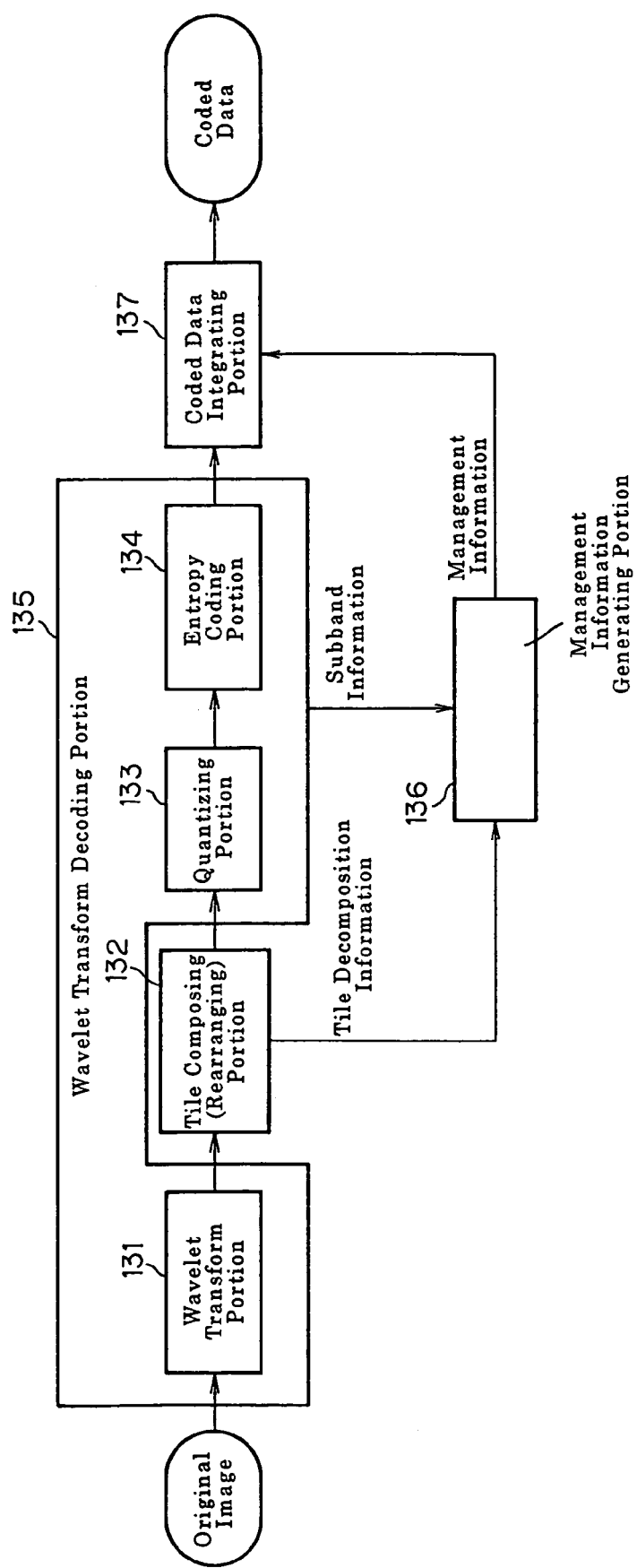
FIG. 18 is a block diagram of an image coding device according to an embodiment 7 of the present invention.

Another image coding device is described as an embodiment 7 of the present invention. FIG. 18 is a block diagram of an image coding device according to the embodiment 7.

This image coding device differs from the embodiment 1 of FIG. 8 and the embodiment 5 of FIG. 5 by the fact that an original image is entirely wavelet-transformed by a wavelet transform portion 131 and, then, wavelet transform coefficients outputted from the wavelet transform portion 131 are rearranged per tile to compose respective tiles.

In FIG. 18, an original image before tiling is wavelet-transformed by a wavelet transform portion 131. A tile composing portion 132 composes tiles by rearranging wavelet transform coefficients so that a tile is composed of coefficients spatially matching the same tile.

FIG. 19A shows an example of subbands obtained by wavelet transform portion 131. In the shown case, a coefficient b0 in the lowest frequency subband spatially correlates with other subband coefficients b1, b2, b3, b4, b5, b6, b7, b8 and b9.

Where b1–b3 consist each of 1×1 coefficient, b4–b6 consist each of 2×2 coefficients and b7–b9 consist each of 4×4 coefficients. These coefficients b0–b9 are taken out of the respective subbands and then arranged to compose a single tile as shown in FIG. 19B. Likewise, all other wavelet transform coefficients are arranged to compose respective tiles. This results in obtaining the same result as in the embodiment 5 whereby an original image is first decomposed into portion tiles and then wavelet transformed.

b0 is not necessarily a single coefficient, but it may be a block composed of k×1 coefficient.

In this case, b1–b3 consist each of k×l, b4–b6 consist each of 2k×2l and b7–b9 consist each of 4k×4l coefficients.

Wavelet transform coefficients organized per tile are outputted from the wavelet transform portion 132. They are quantized by a quantizing portion 133 and entropy-encoded by an entropy-coding portion 134, thus coded information is generated.

On the other hand, a management-information generating portion 136 generates management information necessary for managing and identifying tiles and subbands using spatial-tile-location information from the tile composing portion 132 and subband-location information from the wavelet transform coding portion 135. The management information is used by a coded-information integrating portion 137.

The coded information integrating portion 137 receives the management information from the management information generating portion 136 and the coded information from the entropy-coding portion 134 and it arranges and combines the entropy coded information and adds management information in a bit stream of the coded data, thus generating finally coded data as shown in FIG. 10.

Although the tile-composing portion 132 is installed before the quantizing portion 133 in this embodiment, it is not limited to this arrangement and may be placed after the quantizing portion 133.

Figure 20:
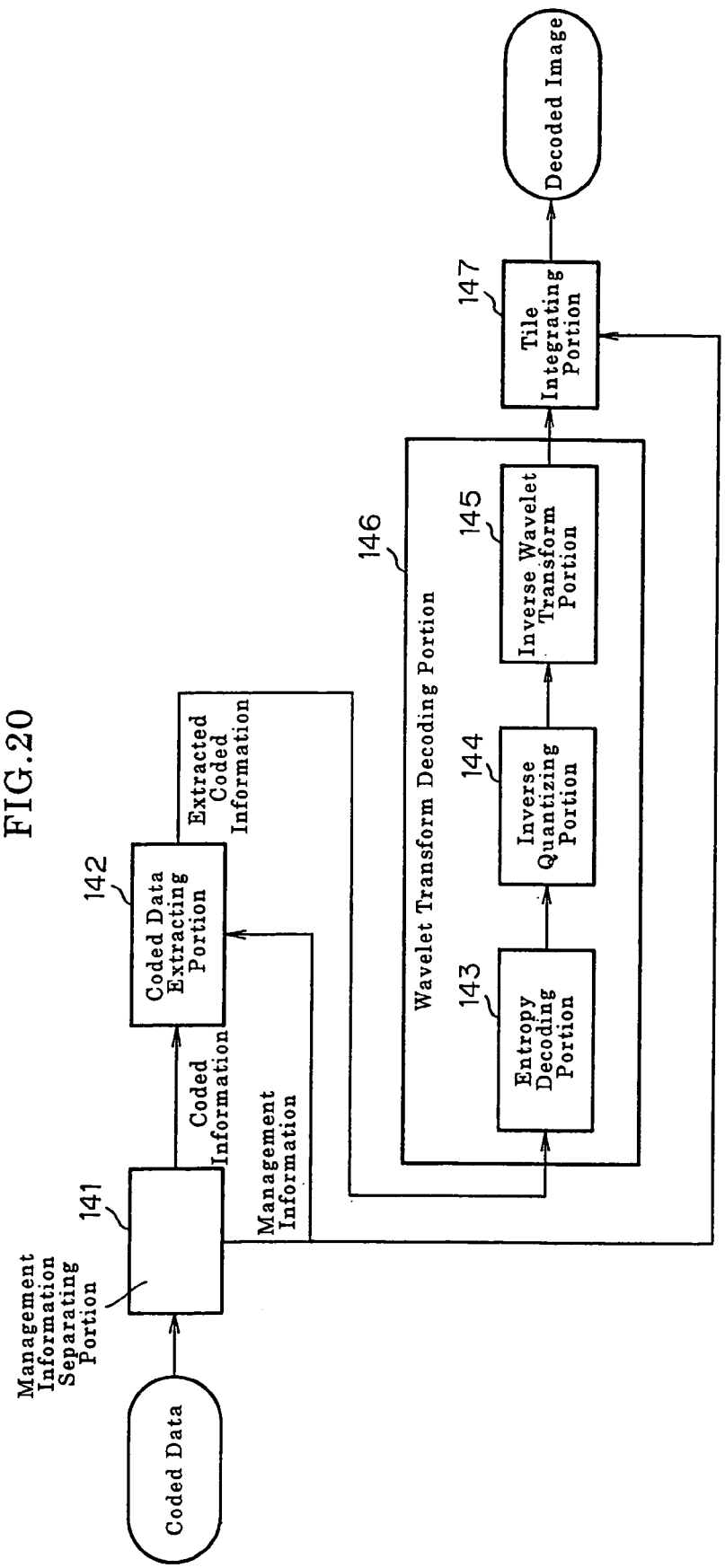
FIG. 20 is a block diagram of an image decoding device according to an embodiment 8 of the present invention.

An image decoding device for decoding data encoded by any one of the above-described image coding devices (embodiment 5 to 7) is now described below as an embodiment 8 of the present invention. FIG. 20 is a block diagram showing the construction of the image decoding device according to the embodiment 8. The decoding device receives coded data encoded by any one of the image coding devices described above as embodiments 5 to 7.

Referring to FIG. 20, the image decoding device separately takes out tile-decomposition management information and subband-management information from the input coded-data stream by a management information separating portion 141 and selectively extracts a necessary part of the coded information meeting the user's demand by a coded data extracting portion 142 according to the management information. Namely, the coded data corresponding to a necessary objective tile(s) having a necessary resolution is extracted by the coded data extracting portion 142.

The extracted coded information is entropy-decoded by an entropy decoding portion 143 and inversely quantized by an inverse quantizing portion 144. Thus, wavelet transform coefficients corresponding to an objective tile to be decoded are now obtained.

The wavelet transform coefficients inversely transformed by an inverse wavelet transform portion 145, thereby a decoded image including peripheral pixels data is produced. The entropy coding portion 143, the inverse quantizing portion 144 and the inverse wavelet transform portion 145 compose a so-called inverse wavelet transform decoding portion 146.

A tile combining portion 147 integrates groups of the decoded tiles according to the management information from the management information-separating portion 141. In this case, a completely decoded image is reproduced with overlaps of decoded tile images at each spatially overlapped portion.

Namely, the embodiment 2 described above with reference to FIG. 12 performed wavelet transform of each tile with adjacent pixels attached thereto. The embodiment 5 uses adjacent pixels in performing wavelet transform of each tile as shown in FIG. 16B. Likewise, the embodiment 6 described with reference to FIG. 17 also uses peripheral pixels in wavelet transform of each tile.

In the image coding device according to the embodiment 7, the process using adjacent pixels is not clearly described but the wavelet transform of a whole original image has been done including the processing theoretically equivalent to that made in the embodiment 5.

Therefore, data of peripheral pixels is produced when each tile image is decoded by the wavelet transform decoding portion 146 in FIG. 20 and the decoded adjacent pixels are superposed on respective neighboring tiles by the tile combining portion 147. The superposition of one pixel on another is achieved by additive operation on the pixels.

Figure 21:
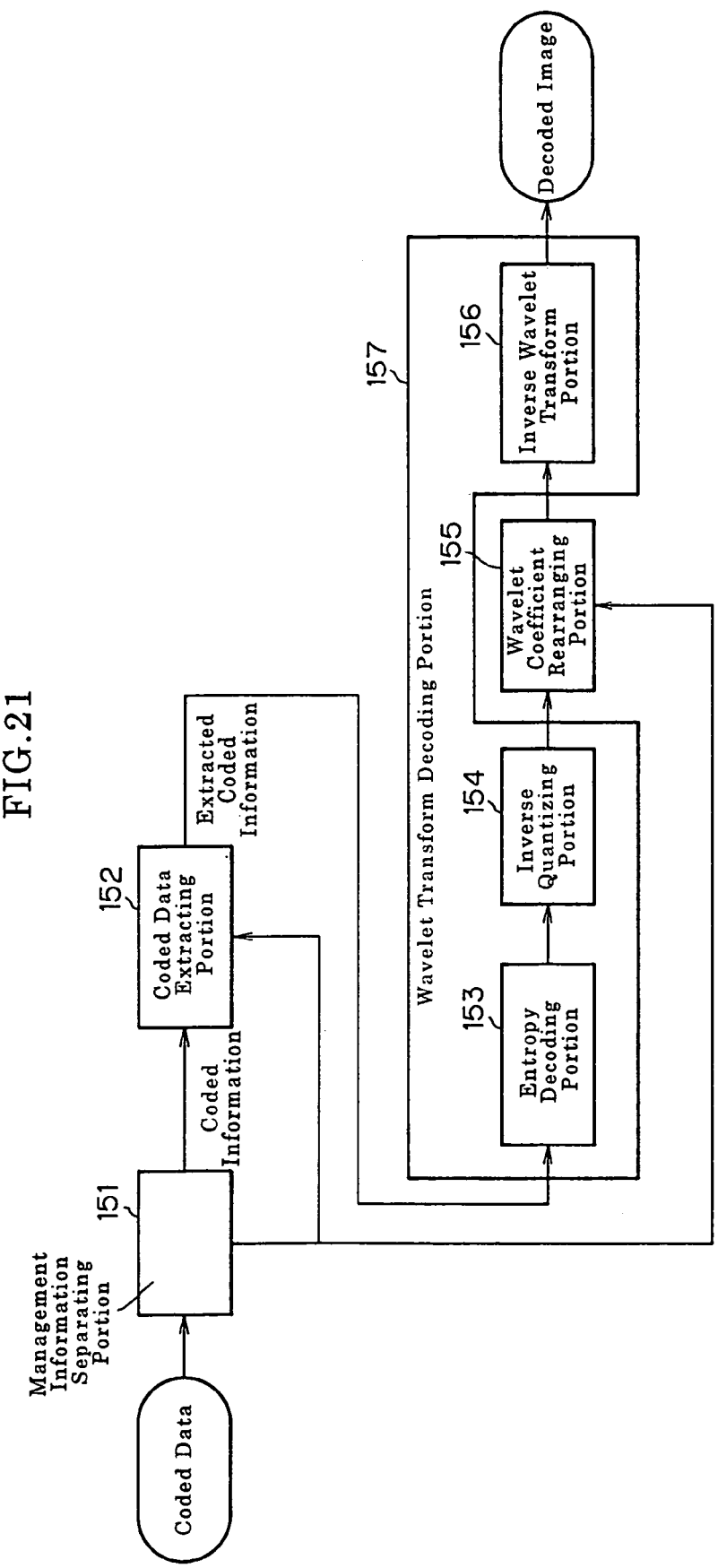
FIG. 21 is a block diagram of an image decoding device according to an embodiment 9 of the present invention.

Another image decoding device is described below as an embodiment 9 of the present invention. Like the above embodiment 8, the input to this embodiment 9 is coded data encoded by any one of the image coding devices being the embodiments 5 to 7. FIG. 21 is a block diagram showing the construction of the image coding device according to the embodiment 9.

Referring to FIG. 21, a management information separating portion 151 separately takes out tile-division management information and subband management information from the input coded-data stream, and a coded data extracting portion 152 selectively extracts a necessary part of the coded information meeting the user's demand according to the management information. Namely, the coded data corresponding to a necessary objective tile(s) having a necessary resolution is extracted by the coded data extracted portion 152.

The extracted coded information is entropy-decoded for each tile by an entropy-decoding portion 153 and inversely quantized by an inverse quantizing portion 154. Wavelet transform coefficients corresponding to an objective tile to be decoded are thus obtained. A wavelet transform coefficient rearranging portion 155 rearranges the wavelet transform coefficients into the state in which they were placed before tile-by-tile arrangement.

Namely, the wavelet transform coefficients divided per tile as shown in FIG. 19B are rearranged in the state shown in FIG. 19A. After completion of processing on all tiles, all wavelet transform coefficients of FIG. 19A are obtained.

The rearranged wavelet transform-coefficients can be decoded at a time by inverse transformation. Namely, the coefficients are inversely transformed by an inverse wavelet transform portion 156, thereby a whole decoded image is reproduced.

The entropy coding portion 153, the inverse quantizing portion 154 and the inverse wavelet transform portion 156 compose a so-called inverse wavelet transform decoding portion 157. Although the wavelet transform coefficient rearranging portion 155 is installed after the inverse quantizing portion 154 in this embodiment, it is not limited to this arrangement and may be placed before the inverse quantizing portion 154.

An image coding device is described below as an embodiment 10 of the present invention. FIG. 22E is a block diagram of a portion of this embodiment, which responds to the wavelet transform portion (102 in FIG. 8, 123 in FIG. 15) of the image coding devices according to the embodiments 1, 2, 5 and 6.

Referring to FIG. 22E, a memory 162 is used for storing wavelet transform coefficients divided into subbands by a wavelet transform portion 161. In this case, the memory 162 stores only wavelet transform coefficients corresponding to a tile being currently processed by the wavelet transform portion 161. The processed data are transferred to a quantizing portion (103 in FIG. 8, 124 in FIG. 15) following the wavelet transform portion 161.

Therefore, the memory 162 has no need to store all data for a whole image and is sufficient to store such an amount of data necessary for processing only one tile.

Namely, if wavelet-transformation without tile decomposition is applied to a whole image as shown in FIG. 22A, it is necessary to store all wavelet transform coefficients (FIG. 22B) outputted from the wavelet transform portion 161. In contrast to the above, the decomposition of an image into tiles as shown in FIG. 22C enables the coding device to use a memory for storing only wavelet transform coefficients corresponding to a small image of FIG. 22D, thus realizing a considerable saving of the memory capacity.

The same effect can be realized in an image decoding device. An image decoding device is described below as another embodiment 11 of the present invention. FIG. 23E is a block diagram, which corresponds to the inverse wavelet transform portion (115 in FIG. 13, 145 in FIG. 20) of the image decoding devices described before as the embodiments 3, 4 and 8.

Referring to FIG. 23E, a memory 171 stores wavelet transform coefficients necessary for decoding one tile and an inverse wavelet transform portion 172 performs the composition of subbands.

An image that must be decoded is assumed to be that shown in FIG. 23B. When performing the wavelet transform of the image without decomposition into tiles, it is necessary to store all wavelet transform coefficients as shown in FIG. 23A. On the contrary, when decoding an image decomposed into tiles as shown in FIG. 23D, the image decoding device can operate using a memory 171 storing the limited number of wavelet transform coefficients as shown in FIG. 23C. The necessary memory capacity can be considerably saved.

All the above-described embodiments can be provided with a plurality of subband-decomposition filters that are adaptively switched over one another to use in the process of wavelet transform coding.

The subband decomposition filters mean low-pass filters and high-pass filters for decomposing an image into subbands as described before for the prior art devices. The subband decomposition process is iterated for wavelet transformation. Filters to be used for this purpose are of various types having different numbers of taps and different coefficient values.

Accordingly, it is desirable to selectively apply suitable one of filters to each subband-decomposition because this enables the coding device to change a necessary amount of adjacent pixels for an objective image by applying a suitable filter for a current subband. Optimal wavelet transformation of an image may be achieved by finding a reasonable compromise between the processing data amount and the image quality.

In image decoding devices responding to such image coding devices, each of subband composition filters responding to respective subband decomposition filters used for wavelet transformation are selectively used for each of subbands to be combined through inverse wavelet transformation.

An image coding device is described below as another embodiment 12 of the present invention. In the embodiment 12, an input image can be encoded by one of plural predetermined coding methods.

Figure 24:
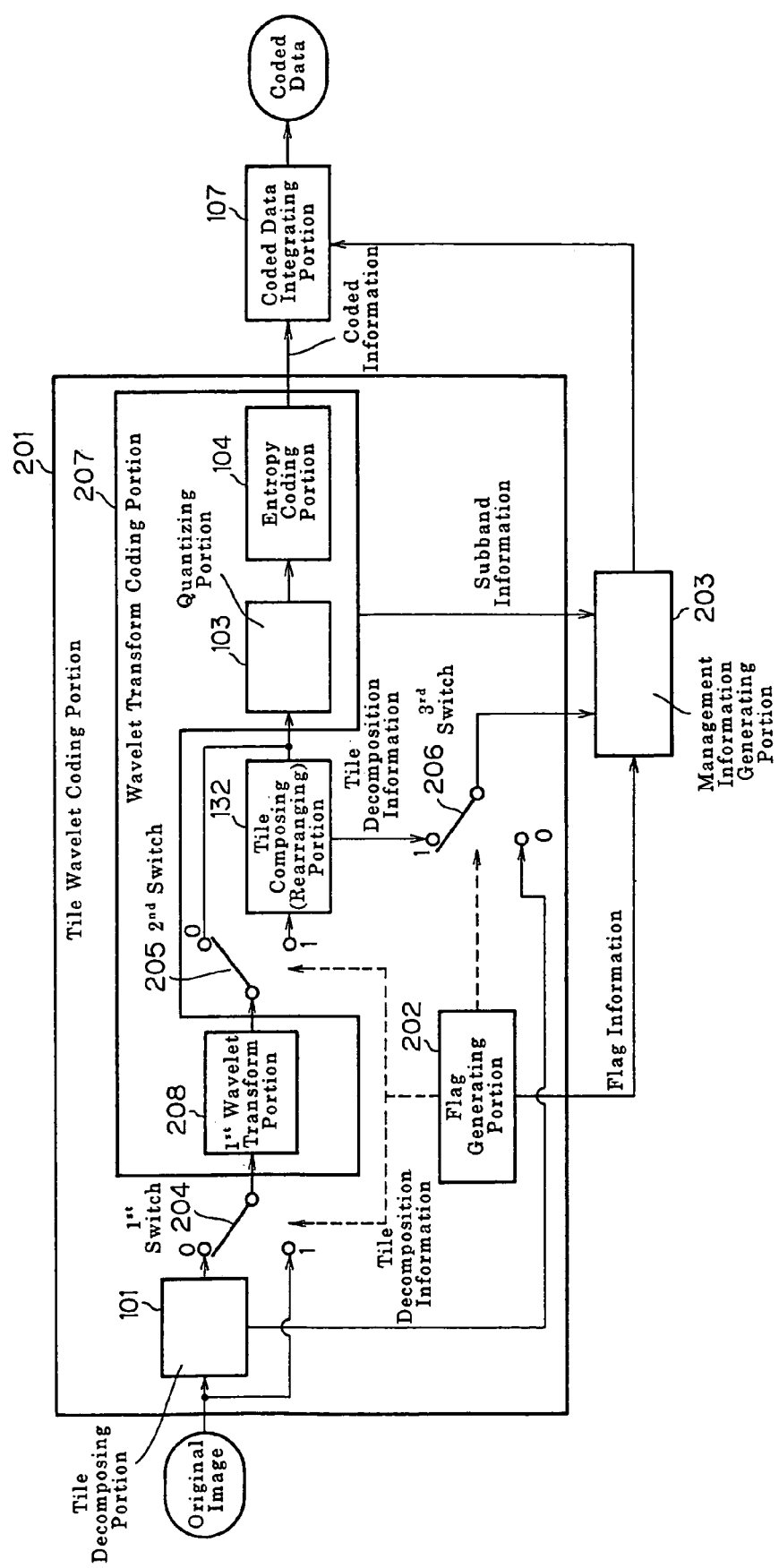
FIG. 24 is a block diagram of an exemplary image coding device according to an embodiment 12 of the present invention.

FIG. 24 is a block diagram showing an exemplary image coding device according to the embodiment 12. This embodiment 12 performs the image coding by switching the coding mode from the method of the embodiment 1 to the method of the embodiment 7 or vice versa.

Referring to FIG. 24, a tile wavelet-coding portion 201 performs wavelet encoding of the input image on a tile-by-tile basis and outputs coded information. This tile wavelet coding portion 201 also outputs tile-decomposition information, subband information and flag information.

A tile-management-information generating portion 203 receives the tile-decomposition information, the subband information and the flag information, and it prepares and provides management information including a combination of the above inputs. A coded data integration portion 107 outputs encoded data which combine the coded information and the management information.

In the tile wavelet-coding portion 201, an input original image is decomposed into tiles by the tile decomposition portion 101 and the decomposed image (tiles) is input to a terminal 0 of a first switch 204. The original image is input to a terminal 1 of the first switch 204. Either of two images through the switch 204 is input to a wavelet transform coding portion 207.

The wavelet transform coding portion 207 performs wavelet encoding of the input image. The output of a first wavelet transform portion 208 is input to a quantizing portion 103 through a second switch 205 or to the quantizing portion 103 through a tile-composing portion 132.

The operation of the first wavelet transform portion 208 is similar to the wavelet transform portion 102 of the embodiment 1 described with reference to FIG. 8. So, the portion is not further described.

A flag generating portion 202 outputs a flag for selecting the encoding method of the embodiment 1 or the encoding method of the embodiment 7 and, at the same time, controls the first switch 204, second switch 205 and third switch 206.

When the switches 204, 205, 206 are connected to terminals 0, the coding device performs the coding operation in the same way as the embodiment 1 does. With the switches connected to terminals 1, the coding device conducts the coding operation in the same way as the embodiment 7 does.

The operation of a tile-composing portion 132 is the same as that of the embodiment 7 described before with reference to FIG. 18. Further description is omitted.

As described above, the present embodiment can encode an input image on a tile-by-tile basis and selectively switches the coding system to the method of the embodiment 1 featured by simple image-by-image processing or the method of the embodiment 7 featured by coding of each tile with no distortion at the boundary thereof.

Figure 25:
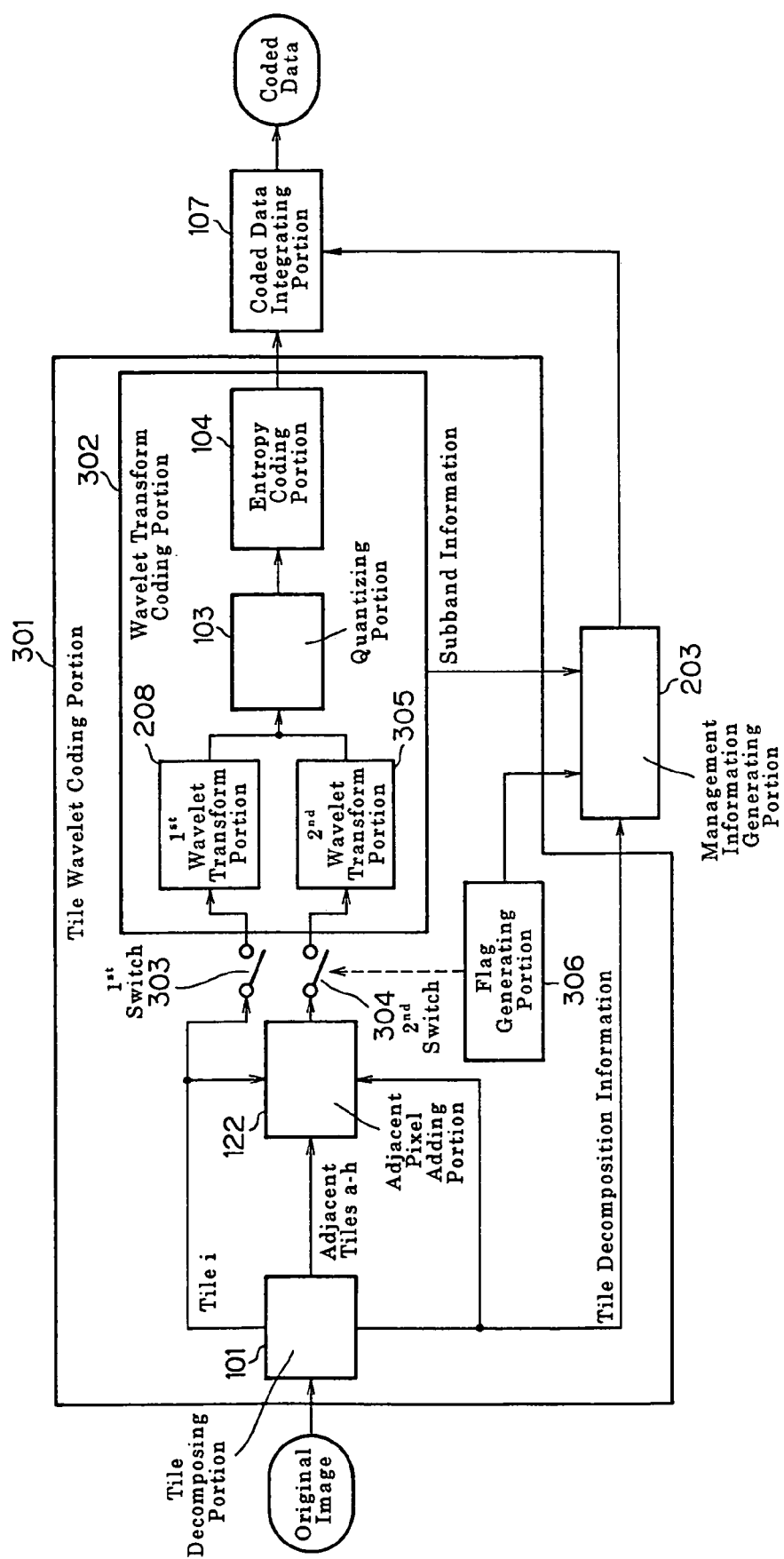
FIG. 25 is a block diagram of another exemplary image coding device according to the embodiment 12 of the present invention.

FIG. 25 is a block diagram of another exemplary image coding device according to the embodiment 12. In this coding device, coding can be conducted by selectively applying the method of the embodiment 1 and the method of the embodiment 5.

Referring to FIG. 25, the image coding device differs from the former type by omitting the tile composing portion 132 (FIG. 24) relating to the embodiment 7 and adding an adjacent pixel adding portion 122 relating to the embodiment 5 and a second wavelet transform portion 305 with a selector switch. Since the operation of the components of this coding device except tile wavelet-transform coding portions 301 and 302 (FIG. 25) are similar to those of the image coding device of FIG. 24, so further description is omitted.

The wavelet transform coding portion 302 performs wavelet coding of an input image and outputs coded information. This device has two inputs: one is connected to a first wavelet transforming portion 208 and the other is connected to a second wavelet transforming portion 305.

When an image is input to the first wavelet transform coding portion 208, the wavelet transform coding portion 302 performs the same operation as the wavelet transform coding portion 207 of FIG. 24 does. When an image is input to the second wavelet transform portion 305, the wavelet transform coding portion 302 performs the same operation as the wavelet transform coding portion 126 of FIG. 15 does, since the operation of the first wavelet transform portion 305 is similar to that of the wavelet transform portion 123 of FIG. 15.

In tile wavelet coding portion 301, the input image is decomposed into tiles and transferred to a first switch 303. On the other hand, the decomposed tile images with adjacent pixels are inputted to a second switch 304. A flag-generating portion 306 selects the use of the first wavelet-transform portion 208 or the second wavelet-transform portion 305 in the wavelet transform coding portion and outputs a flag indicating the selection made.

At the same time, the above selection causes the first switch 303 or the second switch 304 to turn ON. Once the first switch was turned ON, the decomposed image is inputted to the first wavelet transform portion 208 whereby the same coding process as made in the embodiment 1 is performed. Once the second switch 304 was selected, the image decomposed into tiles with peripheral pixels is inputted to the second wavelet-transform portion 305 whereby the coding process of the embodiment 5 is performed.

Thus, the image coding device can process an input image on a tile-by-tile basis and can encode the image by selectively applying the simple coding method of the embodiment 1 or the tile-boundary distortionless coding method of the embodiment 5, (by which each tile can be encoded without distortion of its boundary).

Figure 26:
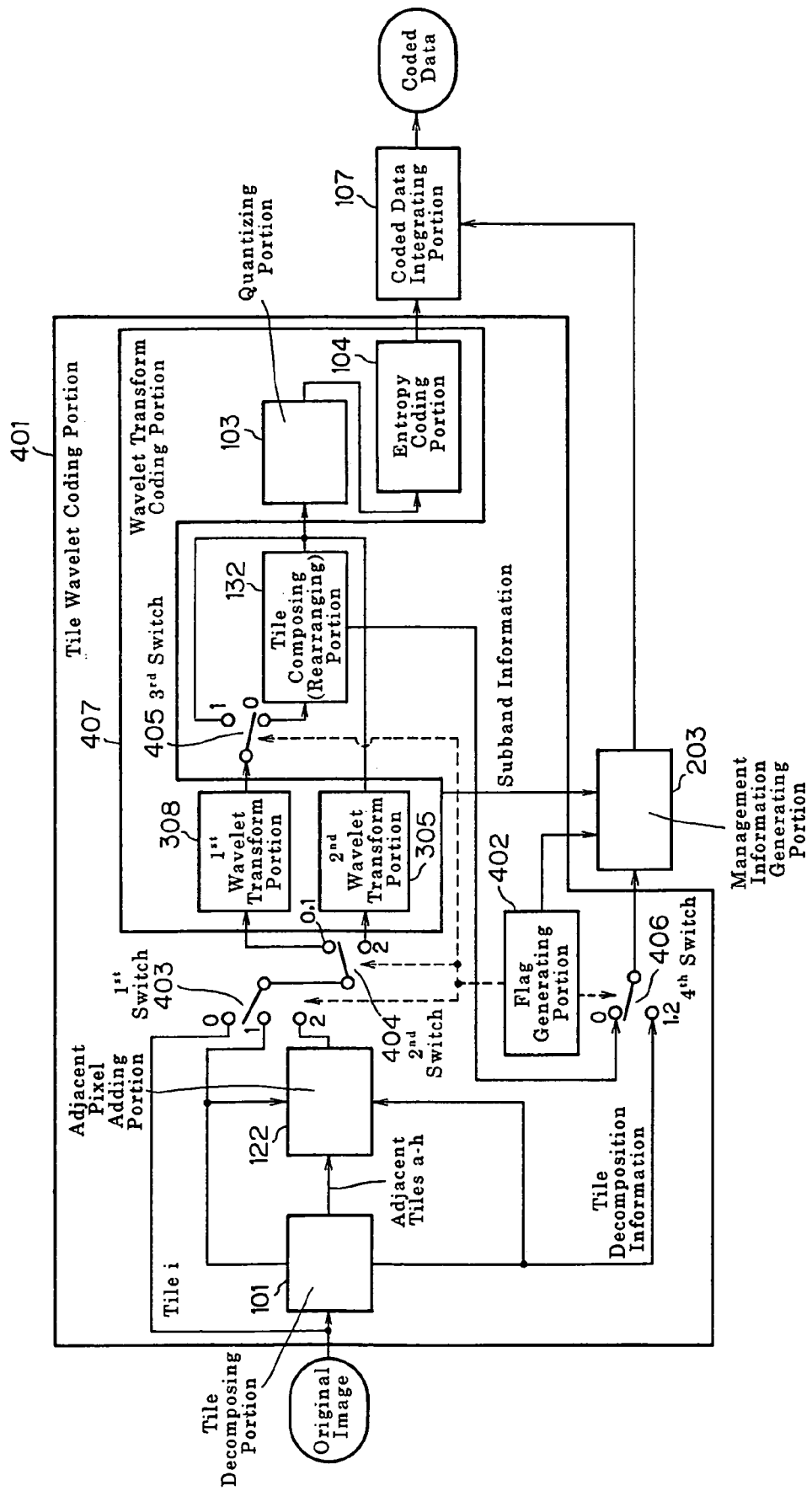
FIG. 26 is a block diagram of another exemplary image coding device according to the embodiment 12 of the present invention.

Another exemplary image coding device according to the embodiment 12 is shown in FIG. 26, which is capable of selectively applying three different coding modes: methods of the embodiments 1, 5 and 7.

As shown in FIG. 26, this image coding device differs in construction from the image coding device of FIG. 25 by including a tile composing portion 132 and switching circuitry for realizing the coding mode of the embodiment 7. The operation of this device excepting a tile wavelet transform coding portion 401 and a wavelet transform coding portion 407 is similar to that of the device of FIG. 24, so further description of the portions is omitted.

The wavelet transform coding portion 407 performs wavelet encoding of an input image and outputs coded information of the image. The output of a first wavelet transform portion 308 is inputted to a quantizing portion 103 through a third switch 405 or further through a tile-composing portion 132. The output of a second wavelet-transform portion 305 is inputted directly to the quantizing portion 103.

In the tile wavelet-coding portion 401, the input image is inputted directly to a terminal 0 of the first switch 403. Alternatively, it is decomposed into tiles and then inputted to a terminal 1 of the first switch 403, or it is discomposed into tiles each including necessary peripheral pixels and then inputted to a terminal 2 of the switch 403.

These images are transferred to a first wavelet-transforming portion 308 or a second wavelet-transforming portion 305 through the second switch 404. The image data is quantized in a quantizing portion 103 and encoded in an entropy-coding portion 104 wherefrom coded information is outputted.

A flag generating portion 402 controls the first, second, third and fourth switches 403, 404, 405, 406 to selectively switch the coding modes 0, 1 and 2. The mode numbers are indicated at terminals of the switches 403, 404, 405 and 406 respectively in FIG. 26.

When the first switch 403 is connected to the terminal 0, all remaining switches 404, 405 and 406 are also connected to their terminals 0. With the switches 403–406 connected to the terminals 0, the image coding device encodes the input image by applying the coding mode of the embodiment 7.

When the switches 403–406 are all connected to their terminals 1, the image coding device encodes the input image by applying the coding mode of the embodiment 1. When the first, second and fourth switches 403, 404, 406 are connected to their terminal 2, the image coding device encodes the input image by using the coding mode of the embodiment 5.

Thus, the image coding device can process an input image on a tile-by-tile basis and can also encode the image by selectively applying one of three coding modes: the simple tile-image-coding method of the embodiment 1, the tile-boundary distortionless coding method of the embodiment 5 or 7, (by which each tile can be encoded without distortion of its boundary).

An image decoding device according to another embodiment 13 of the present invention is described below. The input to this device is coded data encoded by the image coding device according to the embodiment 12 of the present invention. The input data is decoded by this device by applying one of predetermined modes of decoding.

Figure 27:
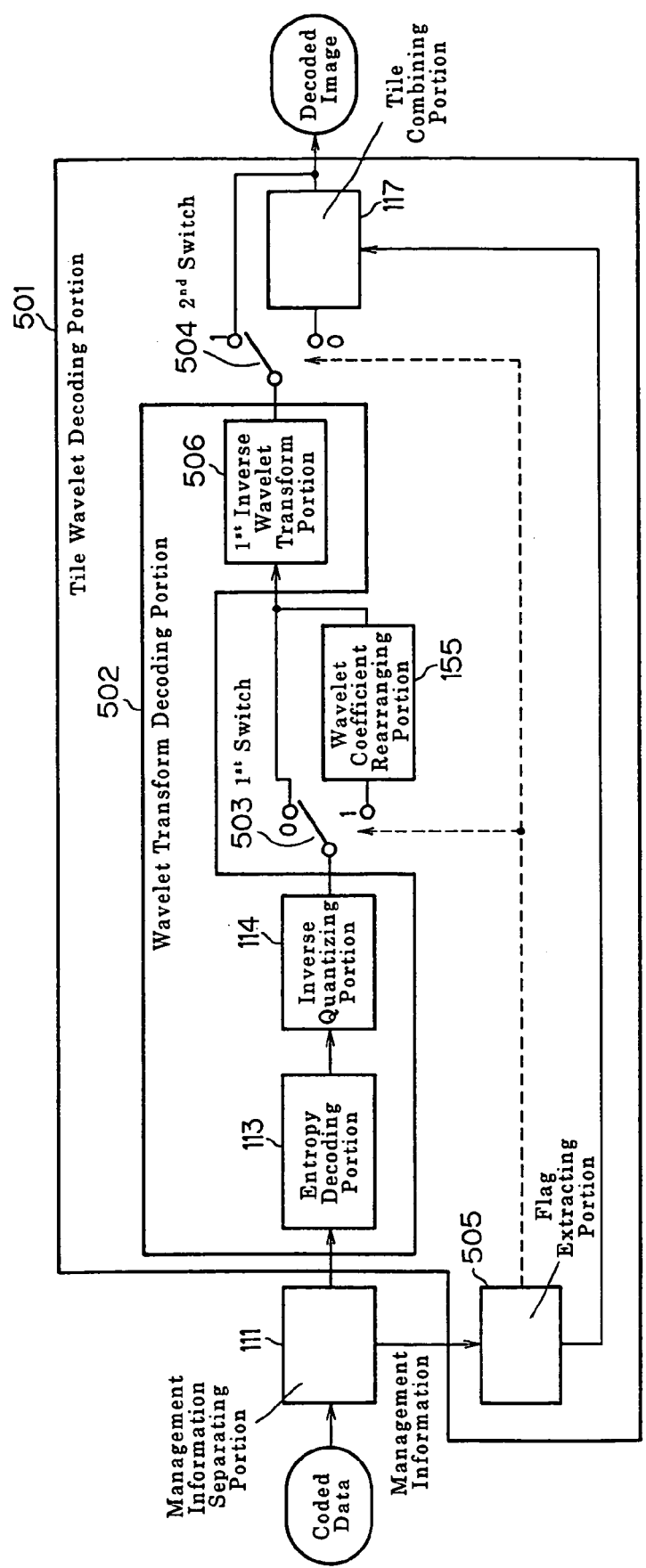
FIG. 27 is a block diagram of an exemplary image decoding device according to an embodiment 13 of the present invention.

FIG. 27 is a block diagram of an exemplary image decoding device according to the embodiment 13, which is capable of decoding coded data generated by the image decoding device (embodiment 13) by selectively applying two coding methods used in the embodiments 1 and 7.

Referring to FIG. 27, coded information and management information are separated from each other at a management-information separating portion 111 and inputted to a tile wavelet decoding portion 501 that in turn performs tile-by-tile decoding of the coded data using the management information and outputs a decoded image.

The coded data is inputted to a wavelet transform decoding portion 502 whereby it is wavelet-decoded. The image decoded by the wavelet transform decoding portion 502 is outputted directly by a second switch 504 or outputted through a tile-combining portion 117.

In the wavelet transform decoding portion 502, the output of an inverse quantizing portion 114 is applied to a first inverse wavelet-transform portion 506 through a first switch 503 or to the first inverse wavelet transform portion 506 through a wavelet-coefficient rearranging portion 155.

The operation of the first inverse wavelet-transform portion 506 is similar to that of the inverse wavelet-transforming portion 115 in the embodiment 3, so further description is omitted.

A flag-generating portion 505 extracts flags for controlling the first switch 503 and the second switch 504 from the management information. With the switches 503 and 504 connected to their terminals 0, the image decoding device performs the same decoding operation that the embodiment 3 does. With the switches 503 and 504 connected to the terminals 1, the image decoding device performs the same decoding operation that the embodiment 9 does.

The operation of a tile-combining portion 117 is similar to that of the same portion of the embodiment 3 described with reference to FIG. 13, so further description is omitted.

The image decoding device according to the embodiment 13 can process coded image data on a tile-by-tile basis and can also decode the image by selectively applying two decoding modes: the simple tile-image-decoding method of the embodiment 3 and the tile-boundary distortionless decoding method of the embodiment 9, (by which each tile can be encoded without distortion of its boundary).

Figure 28:
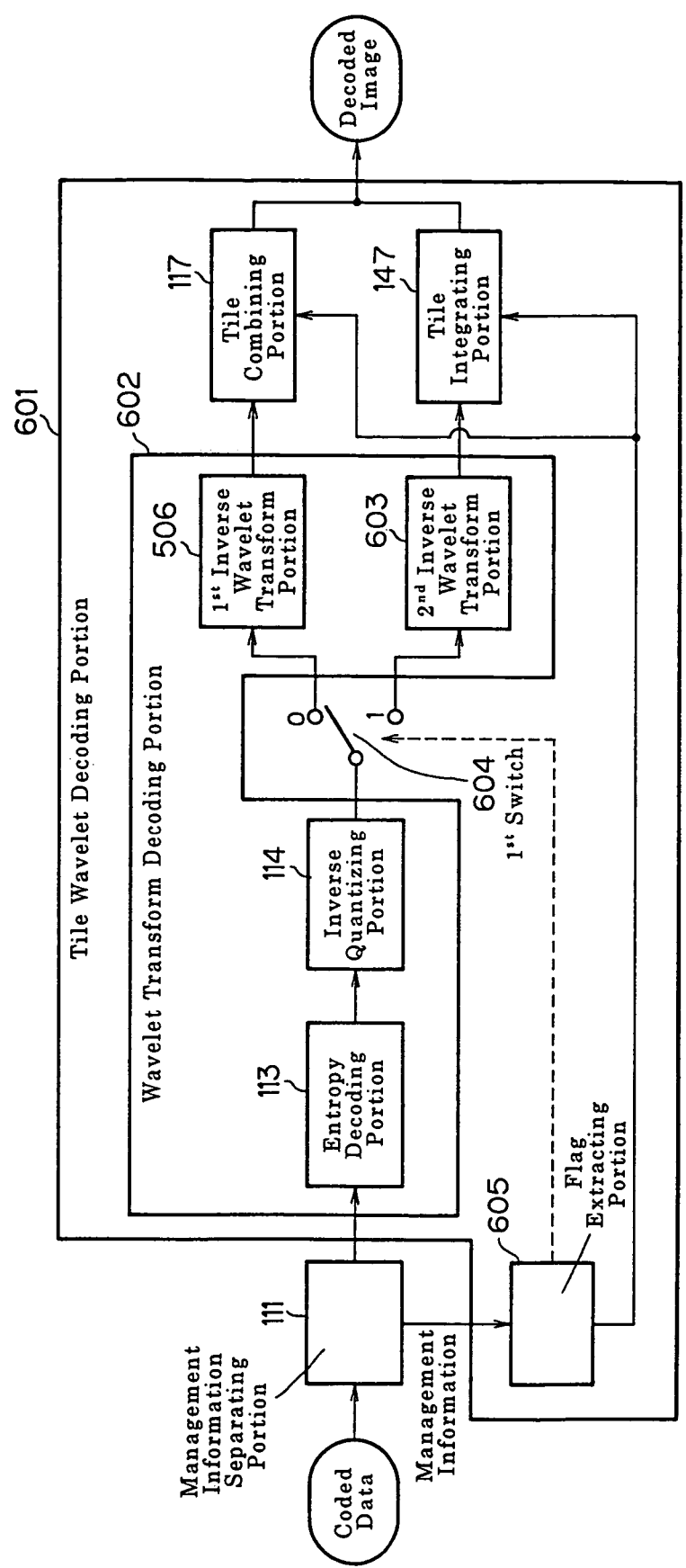
FIG. 28 is a block diagram of another exemplary image decoding device according to the embodiment 13 of the present invention.

FIG. 28 is a block diagram of another exemplary image decoding device according to the embodiment 13 of the present invention, which is capable of decoding image data encoded by selectively applying two coding methods of the embodiments 1 and 5.

The operation of this device except a tile wavelet transform decoding portion 601 and a wavelet transform decoding portion 602 (FIG. 28) are similar to that of the device of FIG. 27, so further description of the like portions is omitted.

The wavelet transform decoding portion 602 performs wavelet decoding of input coded information. The output of an inverse quantizing portion 114 through a first switch 604 is inputted to a first inverse wavelet transform portion 506 or a second inverse transforming portion 603.

The output of the first inverse wavelet transform portion 506 is transferred to a tile composing portion 117 and the output of the second inverse wavelet transform portion 603 is transferred to a tile integrating portion 147.

The operation of the second inverse wavelet transforming portion 603 is similar to the inverse wavelet transform portion 145 of the embodiment 8 described with reference to FIG. 20, so further description is omitted.

In the tile wavelet decoding portion 601, the wavelet transform decoding portion 602 performs wavelet decoding of the coded information and outputs the decoded information to the tile composing portion 117 or the tile integrating portion 147. A decoded image is now reproduced.

On the other hand, a flag-generating portion 605 extracts a flag from the management information and controls the operation of a first switch 604 by the extracted flag. With the switch 604 connected to its terminal 0, the image decoding device performs the same decoding operation that the embodiment 3 does. With the switch 604 connected to its terminal 1, the image decoding device performs the same decoding operation that the embodiment 8 does.

Thus, the image decoding device according to the embodiment 13 can process coded image data on a tile-by-tile basis and can also decode the image by selectively applying two decoding modes: the simple image-decoding method of the embodiment 3 and the tile-boundary distortionless decoding method of the embodiment 8, (by which each tile can be encoded without distortion of its boundary).

Figure 29:
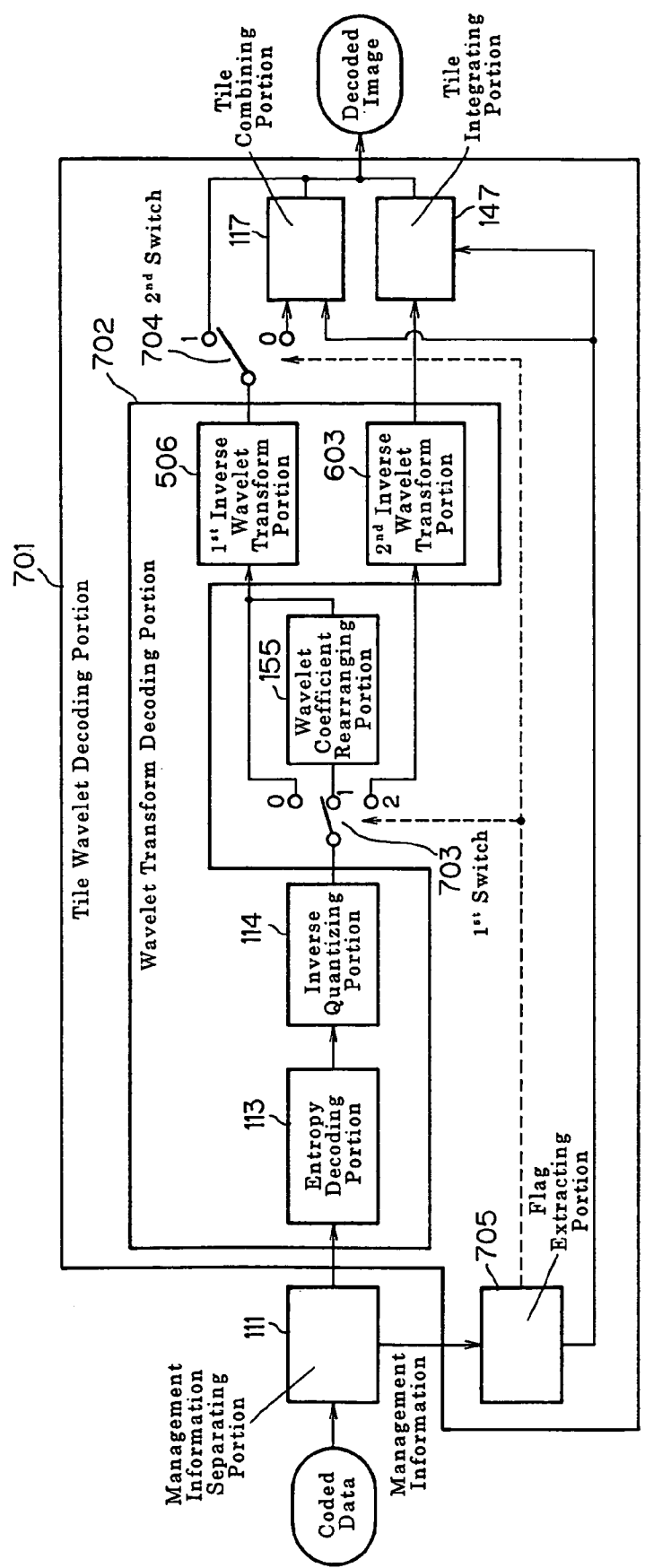
FIG. 29 is a block diagram of another exemplary image decoding device according to the embodiment 13 of the present invention.

FIG. 29 is a block diagram of a further exemplary image decoding device according to the embodiment 13 of the present invention, which is capable of decoding image data encoded by selectively applying three coding methods of the embodiments 1, 5 and 7.

Referring to FIG. 29, this image decoding device differs from the image decoding device of FIG. 28 by the provision of a wavelet-coefficient rearranging portion 155 and related switch circuitry. Since the operation of this device excepting a tile wavelet transform decoding portion 701 and a wavelet transform decoding portion 702 (FIG. 29) is similar to that of the device of FIG. 27, so further description of the like portions is omitted.

The wavelet transform decoding portion 702 performs wavelet decoding of input coded information. The output of an inverse quantizing portion 114 is inputted to a first inverse wavelet transform decoding portion 506 through a terminal 0 of a first switch or a wavelet coefficient rearranging portion 155 through a terminal 1 of the first switch 703. Alternatively, it is transferred to a second inverse transforming portion 603 through a terminal 2 of the first switch 703.

The output of the first inverse wavelet-transforming portion 506 is transferred to a tile-composing portion 117 through a second switch 704 or a decoded image is directly outputted. The output of the second inverse wavelet-transform portion 603 is transferred to a tile-integrating portion 147. The operation of other components is similar to that of like components of the wavelet-decoding portion 602 (FIG. 28), so further description is omitted.

In the tile wavelet decoding portion 701, a flag extracting portion 705 extracts flags for controlling the first switch 703 and the second switch 704 from the management information. The remaining management information is inputted to the tile-composing portion 117 and the tile-integrating portion 147.

With the switches 703 and 704 connected to its terminal 0, the image decoding device performs the same decoding operation that the embodiment 3 does. With the switches 703 and 704 connected to its terminal 1, the image decoding device performs the same decoding operation that the embodiment 9 does. When the first switch 703 is connected to its terminal 2, the device performs, the same decoding operation that the embodiment 8 does irrespective of the position of the second switch 704.

Thus, the image decoding device according to the embodiment 13 can process coded image data on a tile-by-tile basis and can also decode the image by selectively applying three decoding modes: the simple tile-image-decoding method of the embodiment 3 and the tile-boundary distortionless decoding method of the embodiments 8 and 9, (by which each tile can be encoded without distortion of its boundary).

An image coding device is described below as an embodiment 14 of the present invention. In this embodiment, tile management information including information for identifying (distinguishing) tiles is utilized to realize high-speed decoding of any objective tile.

Figure 30:
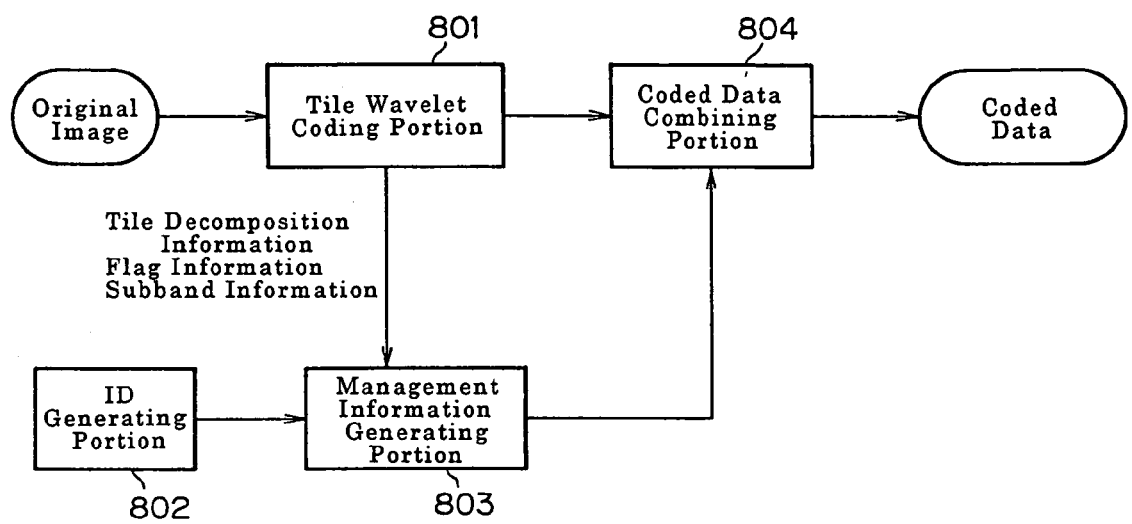
FIG. 30 is a block diagram of an exemplary image coding device according to the embodiment 14 of the present invention.

FIG. 30 is a block diagram showing an exemplary image coding device according to the embodiment 14. Referring to FIG. 30, a tile wavelet-coding portion 801 performs wavelet encoding of an input original image on a tile-by-tile basis, and it generates coded information and management information such as tile-decomposition information, flag information and subband information.

An ID generating portion 802 generates ID information for identifying each tile. Management information generating portion 803 generates management information by combining the management information with the ID information. A coded-data combing portion 804 generates coded data by combining the coded information with the management information and placing a tile-information start code at the head of information of each tile.

FIG. 31A shows an example of the coded data format that defines each tile information consisting of a tile-information start code, management information (tile header) and coded data. The tile wavelet-coding portion 801 can be commonly used for image coding devices according to embodiments 1, 2, 5, 6, 7, 10, 12 and 14.

Figure 31:
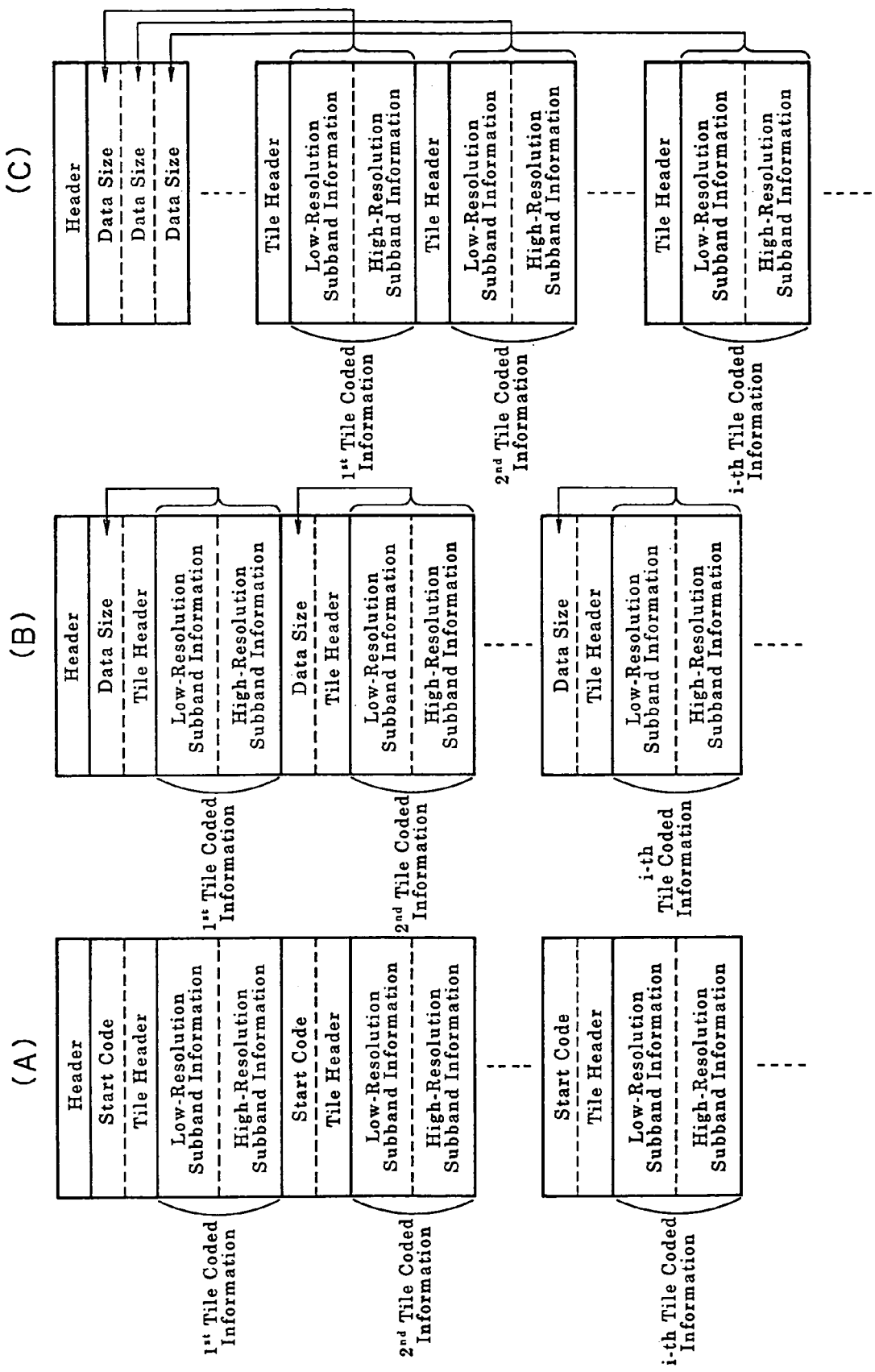
FIG. 31 shows an exemplified bit stream in an image coding device according to the embodiment 14 of the present invention.

To distinguish tiles into which an original image was decomposed, ID numbers (e.g., 1, 2, . . . ) are assigned to tiles arranged in a sequence from the top left as shown FIG. 31. Tiles having ID numbers can be coded in any order and rearranged after coding. Moreover, the ID generating portion 802 may be omitted if the order of tiles to be encoded is predetermined.

The location of each tile can be found by its start code or by its data size (coded information plus tile header).

Figure 32:
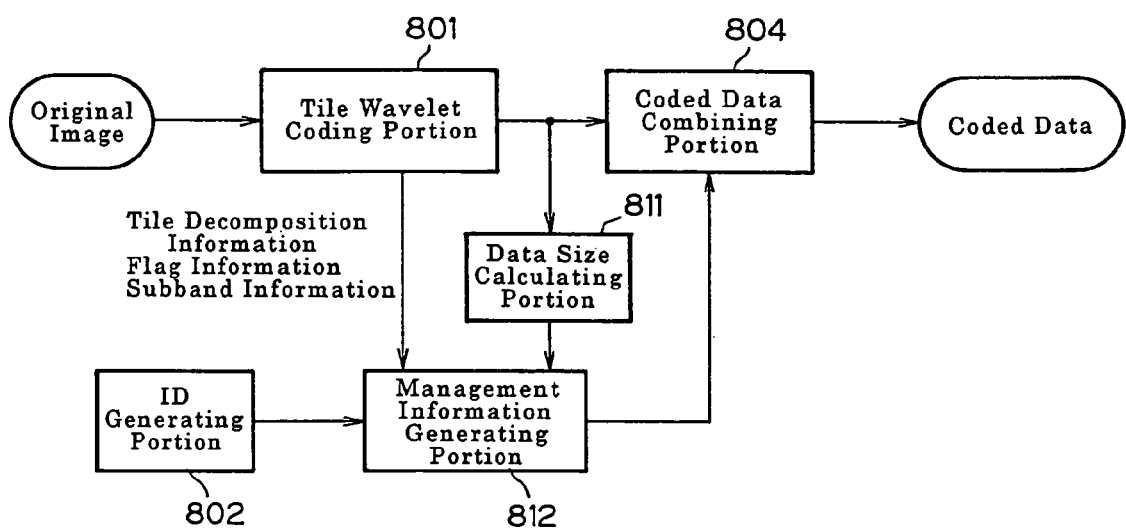
FIG. 32 is a block diagram of another exemplary image coding device according to the embodiment 14 of the present invention.

FIG. 32 is a block diagram of another exemplary image coding device according to the embodiment 14. This image coding device differs from the device of FIG. 30 only by the provision of a data-size calculating portion 811, so the portions other than the calculating portion 811 and the management-information generating portion 812 are omitted from the scope of further description.

Referring to FIG. 32, the data-size calculating portion 811 calculates a size of coded data for each tile and outputs the calculation result. The management information generating portion 812 prepares management information consisting of management information, ID information and a coded tile-data size.

FIG. 31B shows an example of a coded information format in each tile, a coded tile-data size is placed at the head, and following other, management information (tile header) and coded information. The coded tile-data size is not necessarily placed at the top of each tile field. Alternatively, data-size values for all tiles may be placed together at the top of the format.

Figure 33:
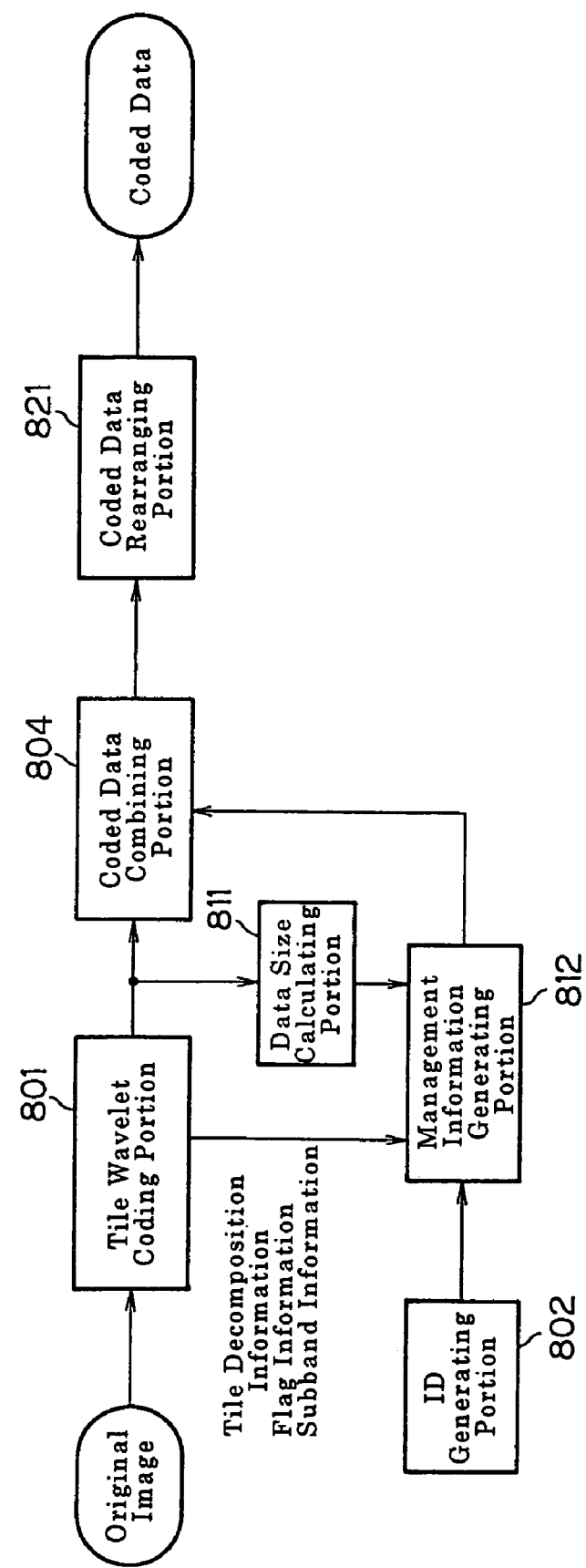
FIG. 33 is a block diagram of another exemplary image coding device according to the embodiment 14 of the present invention.

FIG. 33 is a block diagram of another exemplary image coding device according to the embodiment 14. This image coding device differs from the device of FIG. 32 only by the provision of a coded-data rearranging portion 821, so the portions other than the calculating portion 821 and the management-information generating portion are omitted from the scope of further description.

Referring to FIG. 33, the coded-data rearranging portion 821 extracts a coded data size for each tile from coded data prepared by a code-data combing portion 804 and puts the data-size value at the head of coded data and arranges other remaining data in a given order, then outputs a sequence of the coded data.

In case of an exemplary coded-data format shown in FIG. 31C, the location of any objective tile can be easily determined by summing data-size values from the top tile to a just preceding one.

Figure 34:
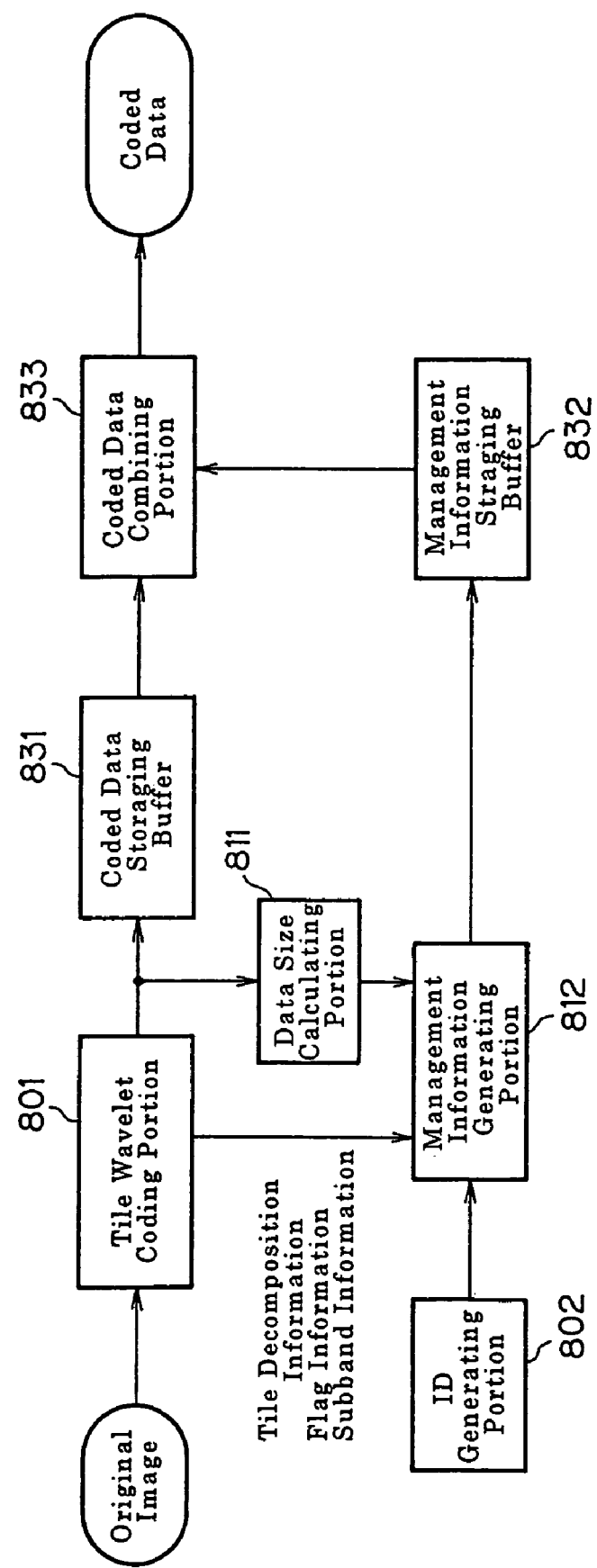
FIG. 34 is a block diagram of another exemplary image coding device according to the embodiment 14 of the present invention.

FIG. 34 shows another exemplary image coding device according the embodiment 14, which can realize the same effects as the above and which differs from the above device of FIG. 32 by the provision of a coded data storing portion 831 and a management information storaging portion 832. Therefore, all components other than the coded-data storing portion 831, the management information storaging portion 832 and a coded data combining portion 833 are omitted from further description.

Referring to FIG. 34, coded information outputted from a tile wavelet coding portion 801 are temporally stored in the coded-data storing portion 831. The management information storaging portion 832 stores tile management information generated by the management-information generating portion 812. It extracts tile-size data from the tile-management-information, sends the data to the coded data combining portion 833 and then outputs the remaining management information.

First, the coded data-combining portion 833 outputs all the data size values for all tiles and then outputs remaining management information combined with coded information.

According to the embodiment 14 of the present invention, it is possible to immediately retrieve coded information of any desirable tile to be decoded.

Figure 35:
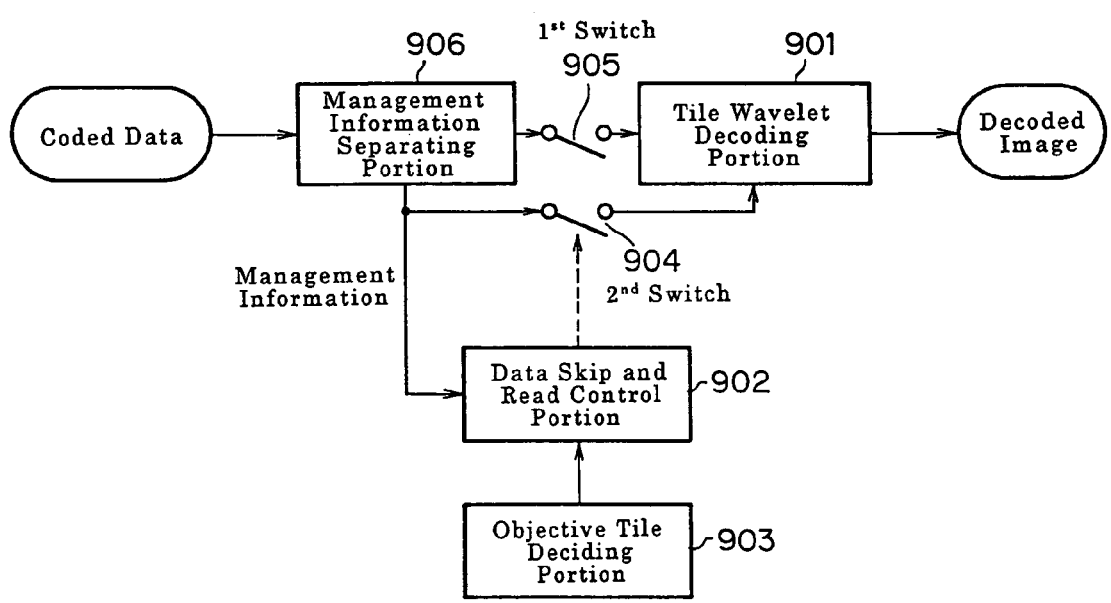
FIG. 35 is a block diagram of an image decoding device according to an embodiment 15 of the present invention.

An image decoding device is described below as another embodiment 15 of the present invention. FIG. 35 is a block diagram of an image decoding device according to the embodiment 15, which is capable of decoding coded data encoded and supplied by the image coding device according to the embodiment 14.

Referring to FIG. 35, an objective-tile deciding portion 903 decides an ID of an objective tile to be decoded according to the user's request. A management-information separating portion 966 retrieves a start code indicating the head of the objective-tile coded information in a coded-data sequence and separates the objective tile management information from the objective-tile coded-information.

Based on the management information, a data skip control portion 902 decides whether the ID of the tile to be decoded matches the ID decided by the deciding portion 903. If two IDs match, the portion 902 turns on both a first switch 905 and a second switch 904. Consequently, a tile wavelet-decoding portion 901 can decode the selected tile only.

If the tile management information includes each tile-data size, the management-information separating portion 906 has no need to search tile-data heads and can find the location of the objective tile data head by skipping the unnecessary amount. The tile wavelet-decoding portion 901 can be commonly used in the image decoding devices according to the embodiments 3, 4, 8, 9, 11, 13 and 15.

According to the embodiment 15, it is possible to immediately retrieve and decode the coded data of the object tile by using only the tile head management information without decoding any other coded data.

An image coding device is now described below as another embodiment 16 of the present invention, which can provide coded tile images that can be decoded immediately to reproduce a single objective tile image as well as adjacent tile images by using tile-management information including neighbors' information.

FIG. 36A is a block diagram of an exemplary image coding device according to the embodiment 16. This device differs from the embodiment 14 of FIG. 30 by the addition of an adjacent tile ID deciding portion 841 and by the operation of a management-information generating portion 841. Other portions are similar to those of the embodiment 14 and omitted from the scope of further description.

A tile wavelet-coding portion 841 can be commonly used in the image coding devices of the embodiments 5, 6, 7, 10, 12 and 14.

Referring to FIG. 36A, the adjacent tile ID deciding portion 841 decides IDs of adjacent tiles necessary for decoding an objective tile according to tile decomposition information, flag information, subband information and tile IDs produced by an ID generating portion 802. A management-information generating portion 842 prepares management information containing tile decomposition information, flag information, subband information and tile ID with adjacent tiles IDs.

Since all adjacent tiles necessary for coding an objective tile are not necessarily given IDs, the number of adjacent IDs to be produced by the peripheral tile ID deciding portion 841 may be limited to, for example, two neighbors existing left above and left below the objective tile as shown in FIG. 36B.

In the coded data format of FIG. 31A, the management information (tile header) may include an objective tile ID and adjacent tiles' IDs.

Figure 37:
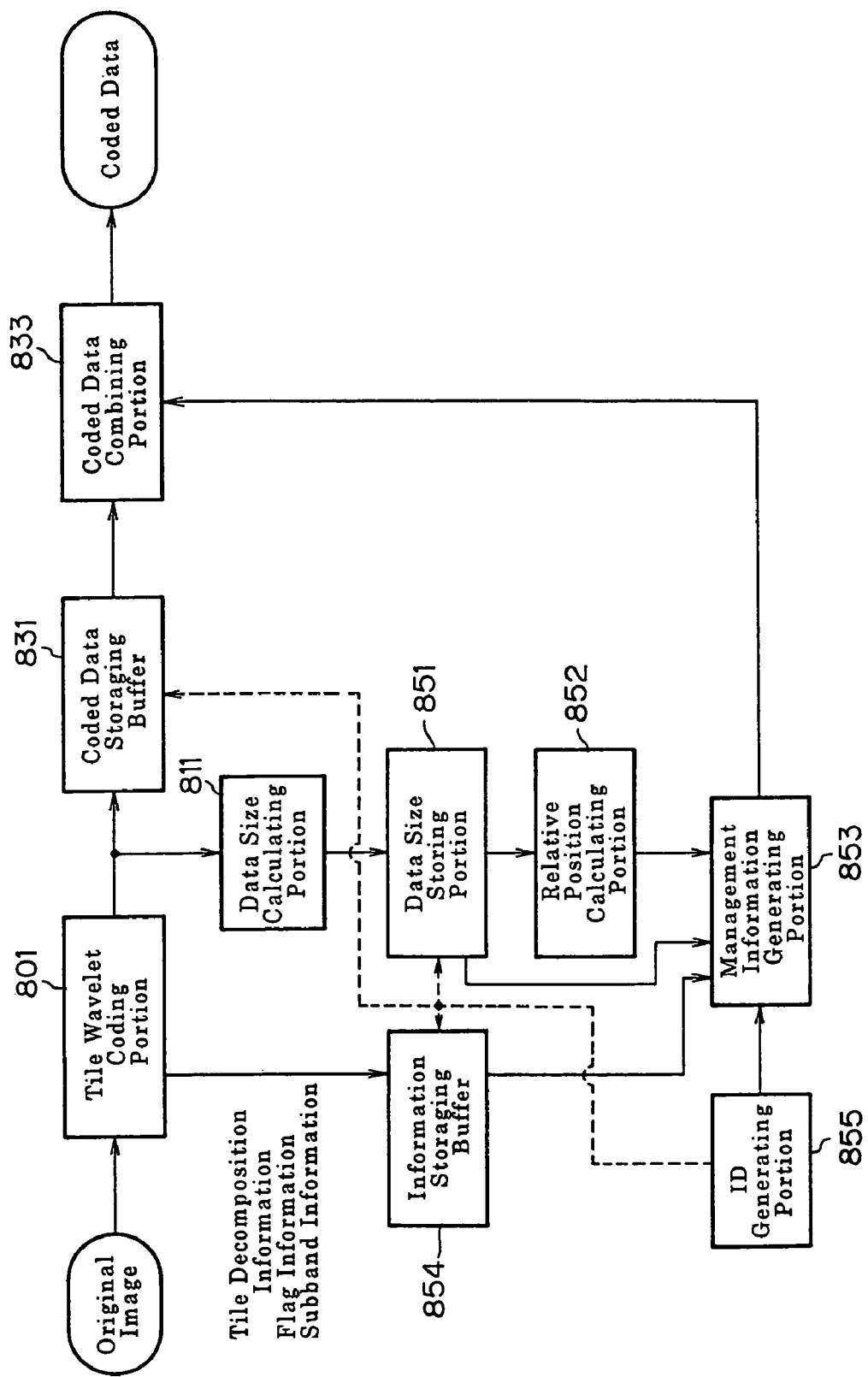
FIG. 37 is a block diagram of another exemplary image coding device according to the embodiment 16 of the present invention.

FIG. 37 is a block diagram of an exemplary image coding device according to the embodiment 16 of the present invention, which is intended to encode tile images that may be rapidly retrieved for decoding by using management information including each objective tile ID with neighbors' IDs. This image coding device is similar in construction to embodiment 14 of FIG. 34 but differs from the embodiment 14 by the absence of the management information storing portion 832 and by the presence of a data-size storing portion 853, relative position calculating portion 852 and information storing buffer 854.

The operation of this image coding device is similar to the embodiment 14 except the operation with the data-size storing portion 851, relative position calculating portion 852, information storaging buffer 854, management information generating portion 853 and ID generating portion 855. Therefore, like components are not described further.

Referring to FIG. 37, coded information outputted from a tile wavelet coding portion 801 are all stored in a coded data storaging buffer 831. Tile-decomposition information, flag information and subband information from the tile wavelet coding portion 801 are all stored in the information storaging buffer 854. Tile-data-size values outputted from the data-size calculating portion 811 are all stored in the data-size storing portion 851.

The ID generating portion 855 outputs ID information to identify each tile and controls the information storing buffer 854, the data-size storing portion 851 and the coded data storaging buffer 831 to output information on a tile-by-tile basis. The data-size storing portion 851 receives a tile ID and outputs a data-size value of the tile specified by the received ID to the management information generating portion 853. It also provides the relative-position calculating portion 852 with the tile-data-size necessary for calculating positions of neighbors relative to the tile having the ID.

The relative-position calculating portion 852 calculates the positions of coded information of the adjacent tiles relative to an objective tile by using the data-sizes of the input tiles and outputs the calculation results. The management information generating portion 853 generates management information by using input information such as tile ID information, tile-decomposition information, flag information, subband information, tile-data-size values, relative positions of adjacent tiles, etc. It outputs the prepared management information to the coded data combining portion 2503.

The above system can produce coded data of tile images, which can be effectively decoded at a high speed without decoding all coded data in such a way that coded data of an objective tile and necessary adjacent tiles may be retrieved and decode by decoding only management information located at the head of the decodable coded data.

Figure 38:
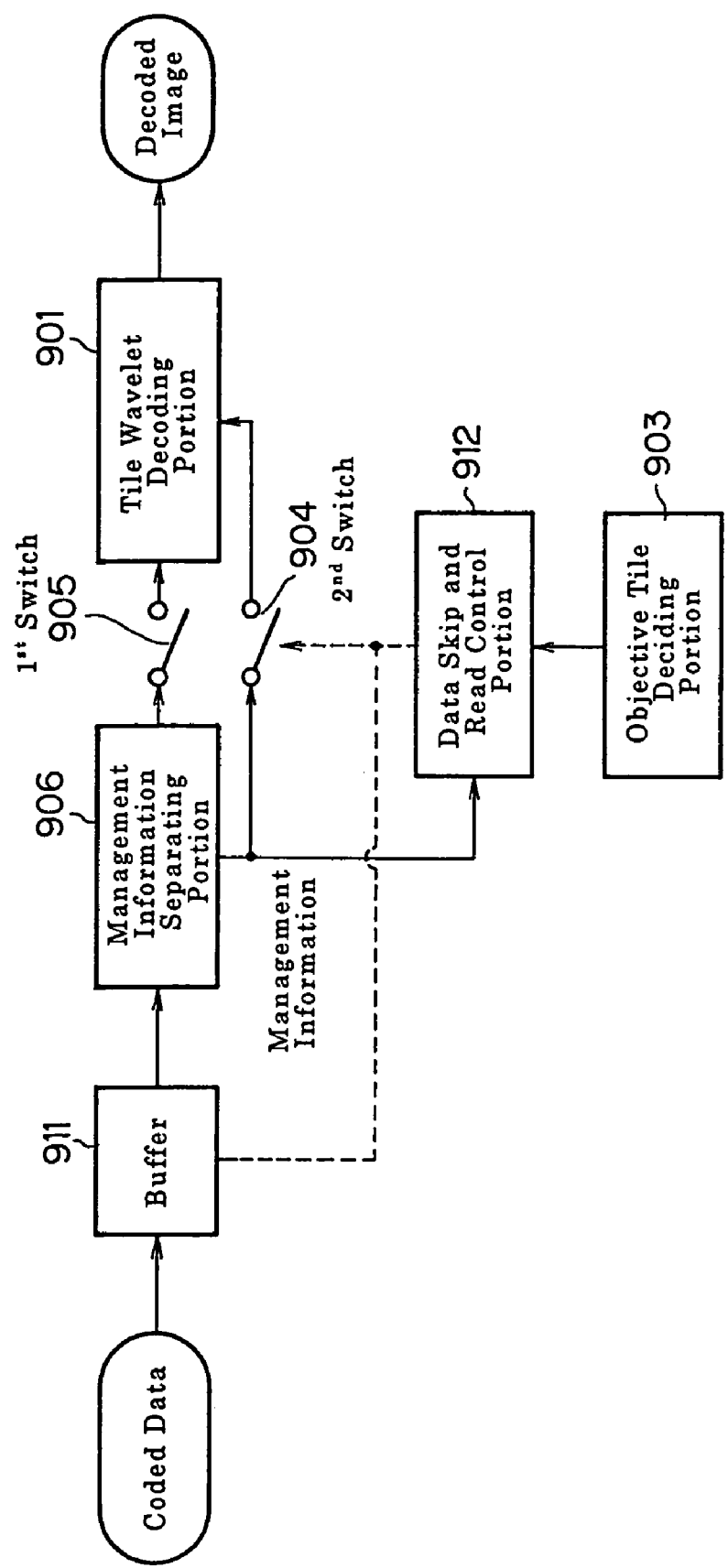
FIG. 38 shows an image decoding device according to an embodiment 17 of the present invention.

An image decoding device is described below as another embodiment 19 of the present invention. FIG. 38 is a block diagram of the image decoding device according to the embodiment 19, which is used for decoding coded data produced by the image coding device according to the embodiment 18. This device is similar to and differs from the embodiment 15 of FIG. 35 only by the addition of a buffer 911. All components other than the buffer 911 and a skip-and-read control portion 912 operate in the same way that like components of the embodiment 15. So, they are omitted from the scope of further description.

Referring to FIG. 38, input coded data is temporally stored in the buffer 911 wherefrom it is subsequently outputted later. The skip-and-read control portion 912 extracts an ID for an objective tile according to the input management information. When the extracted ID matches the ID of the objective tile or the ID of a related adjacent tile, this control portion 912 causes a first switch 905 and a second switch 904 to turn ON.

If the management information contains IDs of adjacent tiles necessary for decoding the objective tile, the control portion 912 controls the buffer storage 911 to output the coded data of the adjacent tiles. Consequently, the tile wavelet-decoding portion 901 can decode a specified tile and necessary neighbors.

If the predetermined number (e.g., two dotted tiles in FIG. 36B) of peripheral IDs decoded in the management information is smaller than the number of necessary peripheral tiles (e.g., six unshaded neighbors in FIG. 36B), IDs of the remaining necessary neighbors are decided from the decoded IDs of the adjacent tiles.

The tile wavelet-decoding portion 901 can be commonly used in embodiments 8, 9, 11, 13 and 15.

The above system can immediately decode any objective tile and necessary adjacent tiles by decoding only the management information put at the head of the coded data. It has no need of decoding all the coded data.

THE POSSIBLE INDUSTRIAL APPLICATIONS

As described herein, following aspects are brought according to the present invention.

In one aspect of the present invention, an image coding device can independently encode each of tiles of an original image, thus providing coded tile images that can be separately treated thereafter. If any of coded tile must be further processed, it can be separately, processed and encoded again with no need of using adjacent pixels. Thus, simple independent encoding and decoding of image tiles is realized.

In another aspect of the present invention, an image decoding device can decode only a desirable coded tile image with no need of decoding any other coded data, thereby minimizing the processing load.

In another aspect of the present invention, in spite of increasing of the coded-data size due to encoding an objective tile image including adjacent pixels, an image decoding device decodes the coded tile image by superposing adjacent pixel values on overlaps, suppressing possible boundary distortion of the tile image.

In still another aspect of the present invention, an image coding device can encode tile images using pixel information on neighboring tiles, achieving high efficiency of image encoding using the correlation between tiles. This can also suppress possible boundary distortion of the tile images.

In another aspect of the present invention, an image coding device can effectively encode a part (plural tiles) of a whole image by performing wavelet transform of only selected tiles, and its wavelet transform is very compact.

An image decoding device responding to the above can also realize compact inverse wavelet transform of coded tile images.

In a further aspect of the present invention, an image coding device can decide exclusion of distant pixels from the scope of adjacent pixels for calculation. This minimizes the number of filtering operations and wavelet-transform operations.

A whole image is wavelet transformed at a time and then wavelet transformed coefficients are rearranged to compose respective tiles. This eliminates the need of iterating the wavelet-transform for each tile.

In another aspect of the present invention, an image decoding device can rearrange coded data (decomposed for each tile) corresponding to an objective tile and then perform inverse wavelet transform of the coded data at a time, thus eliminating the need of repeating inverse wavelet transform for each tile.

Conventional arts demand a large capacity of a memory for holding wavelet transformed coefficients to correspond to resolution of an original image. In contrast to the above, an image coding device according to one aspect of the present invention can use, irrespective of the original image size, a memory which can store only wavelet transform coefficients for capacity corresponds to the size of a tile or tiles for a tile or tiles being currently encoded. This can realize a considerable saving of memory capacity needed.

In another aspect of the present invention, an image decoding device can also use a memory having the capacity limited to a tile size for storing wavelet transform coefficients.

In a further aspect of the present invention, an image coding device can conduct wavelet transform by selectively applying plural suitable filters for decomposing an objective tile image into subbands, thus realizing optimal wavelet transform of the objective tile with the best balance between the image quality and the processing load.

In a further aspect of the present invention, an image decoding device can conduct inverse wavelet transform by selectively applying plural suitable filters for composing subbands, which respond to the subband decomposing filters. Thus, the device realizes the optimal inverse wavelet transform of each tile to be decoded.

In a still further aspect of the present invention, an image decoding device can selectively apply two wavelet transform modes: one for each tile with or without adjacent pixels and the other for each image with or without adjacent pixels. Two modes can be selected in accordance with the input image quality to minimize the increase of transform operations and deterioration of the image quality.

In another aspect of the present invention, an image decoding device can easily retrieve coded information of an objective tile to be decoded by searching management information well organized for identifying every tile. Therefore, it can realize high-speed retrieval and effective decoding of only plural tiles necessary for reproducing an area (several tiles) of a whole image.

In still another aspect of the present invention, an image decoding device can easily retrieve coded information of an objective tile and coded information of adjacent tiles necessary for decoding the objective tile by using management information well organized for identifying every tile.

Therefore, only an area (several tiles) of a whole image can be rapidly reproduced by decoding only necessary tiles.

High efficient coding/decoding of image tiles using adjacent pixel information is also achieved by utilizing the effect of correlative effect of the pixels.

What is claimed is:

1. An image coding device comprising:
   a tile decomposition portion for decomposing image data into tiles each of N pixels×M pixels and outputting the N×M pixels in the tile as an objective data to be coded for a corresponding each of the tiles;
   an adjacent pixel adding portion for providing a objective tile to be coded with adjacent pixels necessary for wavelet transformation of the objective tile when such pixels exist at the periphery thereof;
   a wavelet coding portion for extrapolating a predetermined data when no pixel existing at the periphery of the objective tile, decomposing each of the tiles into subbands and outputting only wavelet coefficients of the objective tile;
   a management information generating portion for generating management information necessary for independently decoding any desirable tile on a subband-by-subband basis; and
   a coded data integrating portion for attaching the management information to coded information to generate a bit stream, wherein the management information includes information on a location of the coded information for each of the tiles in the bit stream and information for managing and identifying each of the subbands,
   wherein the each adjacent pixel to be attached to the objective tile is multiplied by a weighting function according to a distance from the objective tile, when each of the objective tiles is attached the adjacent pixel by the adjacent pixel adding portion.

2. The image coding device as defined in claim 1, wherein the wavelet coding portion is provided with a memory necessary for storing at least data for a tile.

3. The image coding device as defined in claim 2, wherein the wavelet coding portion performs multiple times of the subband decomposition process by selectively applying suitable filters for respective subbands.

4. The image coding device having a combination of plural coding models selectable from claim 2 and having a plurality of selectively applicable coding modes, which further includes a flag generator for generating flags indicating respective coding modes and a control portion for controlling the coding device in a mode specified by the flag generated by the flag generating portion, wherein the management Information generating portion generates management information including the flags generated by the flag generating portion.

5. The image coding device as defined in claim 1, wherein the wavelet coding portion performs multiple times of the subband decomposition process by selectively applying suitable filters for respective subbands.

6. The image coding device having a combination of plural coding models selectable from claim 1 and having a plurality of selectively applicable coding modes, which further includes a flag generator for generating flags indicating respective coding modes and a control portion for controlling the coding device in a mode specified by the flag generated by the flag generating portion, wherein the management Information generating portion generates management information including the flags generated by the flag generating portion.

7. An image decoding device for receiving at its input a bit stream including coded information of image data divided into tiles and each separately wavelet-encoded, and management information for managing the coded information, and for decoding a coded image corresponding to a necessary tile or a necessary resolution, and said management information includes information for specifying a memory location of the coded information corresponding to each tile or each resolution and information for managing and identifying each tile or each resolution, comprising:
- an identifying portion for identifying a memory location of the coded information corresponding to the tile or the resolution to be decoded with reference to said management information according to the tile or the resolution to be coded;
- a wavelet-decoding portion for conducting wavelet-decoding of the coded data based on the memory location of said identified coded information; and
- a tile-combining portion for combining the wavelet-decoded images of each tile,
- wherein a desired area of image is decoded in a desired resolution.

8. The image decoding device as defined in claim 7, wherein said management information is arranged at the separate position from said coded information.

9. The image decoding device as defined in claim 7, wherein a size of the coded information is used as information for specifying the memory location of the coded information corresponding to said each tile or said each resolution.

10. An image decoding device as defined in claim 7, comprising:
- a high resolution coded information extracting portion for extracting the coded information corresponding to high resolution of a specified tile from the bit stream according to said management information; and
- a wavelet-decoding portion for conducting wavelet-decoding of the coded data based on the coded information of the decoded low resolution image and the extracted high resolution coded information,
- wherein a specified area is selected from areas within images which are decoded at a low resolution according to a user's instructions and decoded at a high resolution.

11. An image decoding device for receiving at its input a bit stream including coded information of image data divided into tiles and each separately wavelet-encoded, and management information for managing the coded information, and for decoding a coded image corresponding to a necessary tile, comprising:
- a wavelet processor which conducts wavelet-decoding of the coded data based on the management information,
- wherein the management information includes information for specifying a head location of the coded information corresponding to each tile and/or information for managing and identifying each tile.

12. The image decoding device as defined in claim 11, wherein a tile ID is used as information for managing and identifying said each tile.

13. The image decoding device as defined in claim 11, comprising a coded data extracting portion for extracting a portion of the coded information from the bit stream, the portion of the coded information corresponding to a given tile based on said management information,
- wherein said wavelet-decoding portion conducts wavelet-decoding for the portion of the coded information.

14. The image decoding device as defined in claim 11, wherein a tile-combining portion is provided for combining the wavelet-decoded image of each tile to achieve a desired decoded image.

15. An image encoding device, comprising:
- a tile-dividing portion for dividing an image data into tiles;
- a wavelet-encoding portion for conducting a wavelet-encoding of each tile separately to generate a coded information;
- a management information generating portion for generating management information to manage said coded information; and
- a coded data integrating portion for integrating said management information and said coded information to generate a bit stream,
- wherein the management information includes information for specifying a memory location of the coded information corresponding to each tile or each resolution and information for managing and identifying each tile or each resolution.

16. An image encoding device, comprising:
- a tile-dividing portion for dividing an image data into tiles;
- a wavelet-encoding portion for conducting a wavelet-encoding of each tile separately to generate a coded information;
- a management information generating portion for generating management information to manage the coded information; and
- a coded data integrating portion for integrating the management information and the coded information to generate a bit stream,
- wherein the management information includes information for specifying a head location of the coded information corresponding to each tile and/or information for managing and identifying each tile.

17. The image encoding device as defined in claim 16, wherein a tile ID is used as information for managing and identifying said each tile.

* * * * *